(12) United States Patent
Kobayashi

(10) Patent No.: US 10,191,697 B2
(45) Date of Patent: Jan. 29, 2019

(54) INFORMATION PROCESSING APPARATUS, INFORMATION PROCESSING SYSTEM, AND INFORMATION PROCESSING METHOD

(71) Applicant: Hiroto Kobayashi, Saitama (JP)

(72) Inventor: Hiroto Kobayashi, Saitama (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 15/922,146

(22) Filed: Mar. 15, 2018

(65) Prior Publication Data

US 2018/0267750 A1 Sep. 20, 2018

(30) Foreign Application Priority Data

Mar. 17, 2017 (JP) .................................. 2017-052289
Jan. 31, 2018 (JP) .................................. 2018-015940

(51) Int. Cl.
*G06F 3/12* (2006.01)

(52) U.S. Cl.
CPC .......... *G06F 3/1225* (2013.01); *G06F 3/1204* (2013.01); *G06F 3/1205* (2013.01); *G06F 3/1257* (2013.01); *G06F 3/1258* (2013.01)

(58) Field of Classification Search
CPC .... G06F 3/1225; G06F 3/1204; G06F 3/1205; G06F 3/1257; G06F 3/1258
USPC ....................................................... 358/1.15
See application file for complete search history.

(56) References Cited

U.S. PATENT DOCUMENTS

| | | | | |
|---|---|---|---|---|
| 7,253,915 | B2 * | 8/2007 | Kemp | G06F 3/1204 358/1.15 |
| 7,316,022 | B2 * | 1/2008 | Nishio | G06F 9/4411 709/221 |
| 8,848,217 | B2 | 9/2014 | Kobayashi | |
| 8,867,077 | B2 | 10/2014 | Kobayashi | |
| 8,953,214 | B2 | 2/2015 | Kobayashi | |
| 9,025,193 | B2 | 5/2015 | Asano | |
| 9,218,150 | B2 * | 12/2015 | Takagi | G06F 3/1204 |

(Continued)

FOREIGN PATENT DOCUMENTS

JP 2015-008007 1/2015
JP 2015-225481 12/2015

*Primary Examiner* — Neil R McLean
(74) *Attorney, Agent, or Firm* — IPUSA, PLLC

(57) ABSTRACT

An information processing apparatus executes a printer driver corresponding to image forming apparatuses. The information processing apparatus includes a processor executing a process including displaying a first setting screen for making settings relating to printing by the printer driver; displaying a second setting screen different from the first setting screen; storing, in a first storage, first model information relating to a model corresponding to a predetermined image forming apparatus; storing, in a second storage different from the first storage, the first model information corresponding to another image forming apparatus different from the predetermined image forming apparatus; storing, in the second storage, connection destination information for identifying an image forming apparatus connected to the information processing apparatus; and displaying the second setting screen corresponding to the image forming apparatus connected to the information processing apparatus, by using the connection destination information stored in the second storage.

15 Claims, 30 Drawing Sheets

(56) References Cited

U.S. PATENT DOCUMENTS

| | | | |
|---|---|---|---|
| 9,274,736 B2 | 3/2016 | Kobayashi | |
| 9,298,411 B2 | 3/2016 | Kobayashi | |
| 9,442,678 B2 | 9/2016 | Kobayashi et al. | |
| 9,547,461 B2 | 1/2017 | Kobayashi et al. | |
| 2010/0245909 A1* | 9/2010 | Yamaguchi | G06F 3/1204 |
| | | | 358/1.15 |
| 2011/0058199 A1 | 3/2011 | Kobayashi | |
| 2011/0286036 A1 | 11/2011 | Kobayashi | |
| 2012/0127525 A1* | 5/2012 | Uchibori | G06F 3/1204 |
| | | | 358/1.15 |
| 2017/0078520 A1 | 3/2017 | Kobayashi | |

* cited by examiner

FIG.8A

```
<feature="color" default="color">
            <pickone ="color"/>
            <pickone ="mono"/>
</feature>
<feature="orientation" default="portrait">
            <pickone ="portrait"/>
            <pickone ="landscape"/>
</feature>
<feature="duplex" default="off">
            <pickone ="off"/>
            <constraint condition="duplexunit == on">
                        <pickone ="left"/>
                        <pickone ="top"/>
            </constraint>
                        .
                        .
                        .
</feature>

<option="duplexunit" default="off">
            <pickone ="off"/>
            <pickone ="on"/>
</option>
<option="optionA" default="off">
            <pickone ="off"/>
            <pickone ="on"/>
</option>
<option="optionA2" default="off">
            <pickone ="off"/>
            <pickone condition="optionA == on">
                        <pickone ="on"/>
            </condition>
                        .
                        .
                        .
</option>

<spec="pdllevel" default="3"/>
<spec="ppm" default="30"/>
<spec="language" default="japanese"/>
```

- 810
- 811 (feature block)
- 812 (option block)
- 813 (spec block)

FIG.8B

```
<feature="color" default="mono">
            <pickone ="mono"/>
</feature>

<feature="orientation" default="portrait">
            <pickone ="portrait"/>
            <pickone ="landscape"/>
</feature>

<feature="duplex" default="off">
            <pickone ="off"/>

.
                .
                .

</feature>
```
⎫
⎬ 821
⎭
⎫
⎬ 820
⎭

```
<spec="language" default="japanese"/>
```
⎫
⎬ 822
⎭

FIG.9

MANAGEMENT TOOL — 900

Menu

Select a printer driver:

PXXX Driver for Universal Print — 901

| Model — 902 | Version | Action |
|---|---|---|
| ☐ MP XXXX,MP XXXX,MP XXXX,M... | 1.0 | — |
| ☒ MP XXXX,MP XXXX,MP XXXX,MP XXXX,M... | 1.0 | Add |
| ☐ MP XXXX | 1.0 | — |
| ☐ MP XXXX | 1.0 | — |
| ☐ MP XXXX | 1.0 | — |
| ☐ MP XXXX,MP XXXX | 1.0 | — |
| ☐ MP XXXX,MP XXXX,MP XXXX | 1.0 | — |
| ☐ MP XXXX,MP XXXX,MP XXXX,M... | 1.0 | — |
| ☐ MP XXXX,MP XXXX | 1.0 | — |
| ☐ MP XXXX | 1.0 | — |

903

[ ADD ] — 904   [ DELETE ]   [ APPLY ] — 906

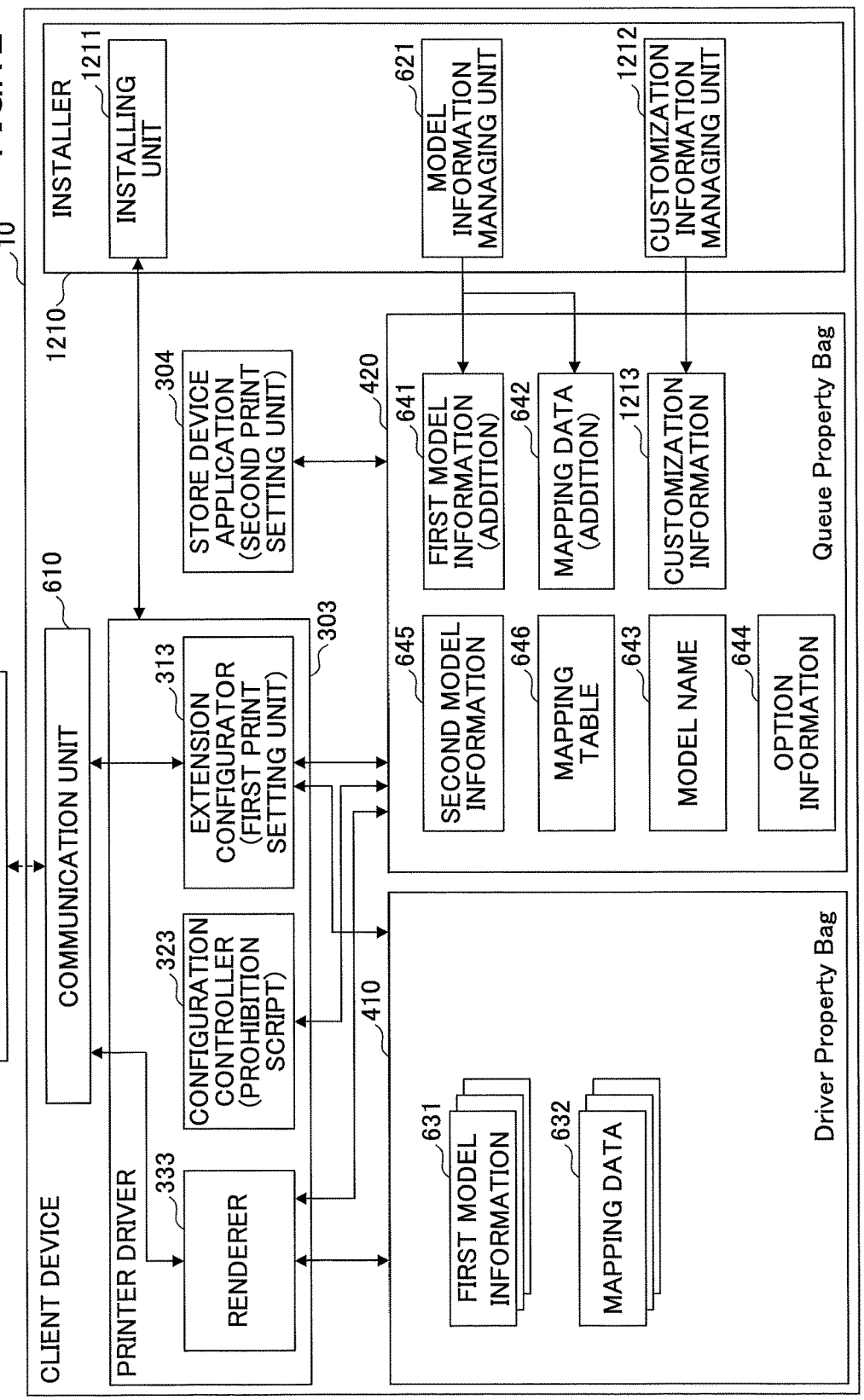

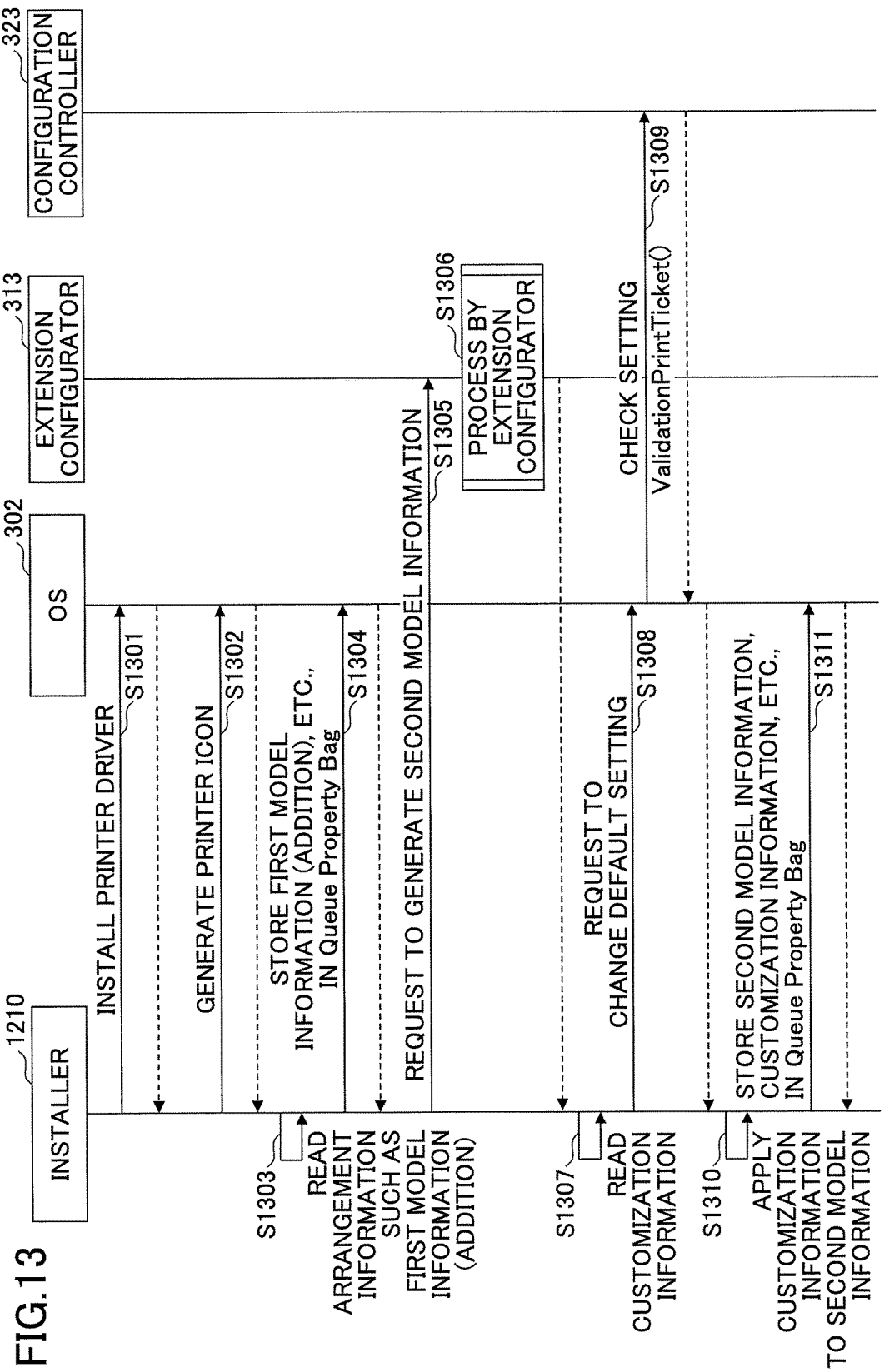

FIG.14

SERVER APPARATUS — 30

STORAGE UNIT — 1412
- INSTALLER — 1210
- PRINTER DRIVER PACKAGE OF MINIMUM CONFIGURATION — 1413
- MODEL INFORMATION OF MODEL A — 1414a
- MODEL INFORMATION OF MODEL B — 1414b
- MODEL INFORMATION OF MODEL C — 1414c

DRIVER PROVIDING UNIT (WEB SERVER) — 1411

CLIENT DEVICE — 10

STORAGE UNIT — 1422
- PRINTER DRIVER PACKAGE OF MODEL B — 1423
  - INSTALLER — 1210
  - PRINTER DRIVER PACKAGE OF MINIMUM CONFIGURATION — 1413
  - MODEL INFORMATION OF MODEL B — 1414b

DRIVER ACQUIRING UNIT (WEB BROWSER) — 1421

FIG.17

PROPERTY OF MODEL COMMON PRINTER DRIVER — 1700

| OVERALL | COMMON | PORT | DETAILED SETTINGS | MANAGEMENT OF COLOR | SECURITY | OPTION CONFIGURATION | APPLICATION SETTINGS |

SELECT MODEL(S):
auto

ACQUIRE PRINTER INFORMATION(U)

PRESENT MODEL  Generic Model

SELECT OPTION
☑ DOUBLE-SIDED PRINTING(D)    ☑ STAPLE(S)
☑ PUNCH(P)
PUNCH UNIT(P):
FOR JAPAN

SET SHEET FEEDING TRAY
SET SHEET FEEDING TRAY SETTING LIST(I):
(SET SHEET FEEDING TRAY/SHEET SIZE)     CHANGE SHEET FEEDING TRAY SETTING(C)...

| SET SHEET FEEDING TRAY | SHEET SIZE |
|---|---|
| TRAY 1 | NO SETTING |
| TRAY 2 | NO SETTING |
| TRAY 3 | NO SETTING |
| TRAY 4 | NO SETTING |
| TRAY 5 | NO SETTING |

☑ FIX MODEL — 1701

☑ AUTOMATICALLY ACQUIRE PRINTER INFORMATION(A)

[ OK ]  [ CANCEL ]  [ APPLY(A) ]  [ RETURN TO STANDARD(R) ]  [ HELP ]

INFORMATION PROCESSING APPARATUS, INFORMATION PROCESSING SYSTEM, AND INFORMATION PROCESSING METHOD

CROSS-REFERENCE TO RELATED APPLICATION

The present application claims priority under 35 U.S.C. § 119 to Japanese Patent Application No. 2017-052289, filed on Mar. 17, 2017 and Japanese Patent Application No. 2018-015940, filed on Jan. 31, 2018, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

In the Windows Operating System (OS) from Windows (registered trademark) 2000 to Windows 7 of the related art, an architecture referred to as a Version 3 (hereinafter referred to as "V3") printer driver is adopted as the architecture of the printer driver. Furthermore, in the Windows OS on and subsequent to Windows 8, in addition to Version 3, an architecture of a new printer driver referred to as a Version 4 (hereinafter referred to as "V4") printer driver has been adopted.

As a technique related to this, there is known a technique for efficiently editing print setting information by holding model dependent information, which is information relating to the V4 printer driver that depends on the model (see, for example, Patent Document 1).

Furthermore, as an information processing apparatus that executes the V3 printer driver, there is known an information processing apparatus in which configuration information of a device is acquired from the connected device (image forming apparatus), and based on the acquired configuration information, settings can be made in accordance with the connected device (see, for example, Patent Document 2).

Patent Document 1: Japanese Unexamined Patent Application Publication No. 2015-225481
Patent Document 2: Japanese Unexamined Patent Application Publication No. 2015-8007

SUMMARY OF THE INVENTION

An aspect of the present invention provides an information processing apparatus, an information processing system, and an information processing method, in which one or more of the disadvantages of the related art are reduced.

According to one aspect of the present invention, there is provided an information processing apparatus for executing a printer driver corresponding to one or more image forming apparatuses, the information processing apparatus including a processor, in communication with a memory, executing a process including displaying, by a first print setter on a display device, a first print setting screen for making a setting relating to printing by the printer driver; displaying, by a second print setter on the display device, a second print setting screen for making a setting relating to the printing, the second print setting screen being different from the first print setting screen; storing, in a first storage area, one or more pieces of first model information including information relating to a model corresponding to a predetermined image forming apparatus among the one or more image forming apparatuses; storing, by a model information manager in a second storage area that is different from the first storage area, the first model information corresponding to another image forming apparatus, among the one or more image forming apparatuses, that is different from the predetermined image forming apparatus; storing, by the first print setter in the second storage area, connection destination information including information for identifying an image forming apparatus, among the one or more image forming apparatuses, connected to the information processing apparatus; and displaying, by the second print setter, the second print setting screen corresponding to the image forming apparatus connected to the information processing apparatus, by using the connection destination information stored in the second storage area, wherein information cannot be added to the first storage area after the printer driver is installed in the information processing apparatus, but information can be added to the second storage area after the printer driver is installed in the information processing apparatus.

BRIEF DESCRIPTION OF THE DRAWINGS

FIGS. 8A and 8B are diagrams illustrating images of model information according to the first embodiment of the present invention;

FIG. 9 is a diagram illustrating an example of a display screen of a management tool according to the first embodiment of the present invention;

FIG. 12 is a functional block diagram of the client device according to a second embodiment of the present invention;

FIG. 13 is a sequence diagram illustrating an example of an installation process according to the second embodiment of the present invention;

FIG. 14 is a diagram illustrating an image of the information processing system according to a third embodiment of the present invention;

FIG. 17 is a diagram illustrating an example of display screen according to the third embodiment of the present invention;

DETAILED DESCRIPTION OF THE PREFERRED EMBODIMENTS

In the V4 printer driver of the related art, two types of user interfaces (UIs) are adopted: a user interface used in a desktop application (hereinafter referred to as a "desktop UI"), and a user interface used in a store application (hereinafter referred to as a "store application UI").

Among these, due to limitations of the OS, the store application UI is restricted in terms of bidirectional communication with an image forming apparatus, and access to information stored in a storage area different from a predetermined storage area, etc. Similarly, with respect to a prohibition script that performs a prohibition process in a V4 printer, there are restrictions in terms of bidirectional communication with an image forming apparatus, and access to information stored in a storage area different from a predetermined storage area, etc.

Due to these restrictions, it has been difficult to add information of a new compatible model, to the printer driver, when implementing a V4 printer driver common to models, that can be used by a plurality of image forming apparatuses.

A problem to be solved by an embodiment of the present invention is easily add information of a new compatible model, to a V4 printer driver common to models, the V4 printer driver being usable by a plurality of image forming apparatuses.

In the following, embodiments of the present disclosure are described in detail by referring to the accompanying drawings.

<System Configuration>

Figure 1:
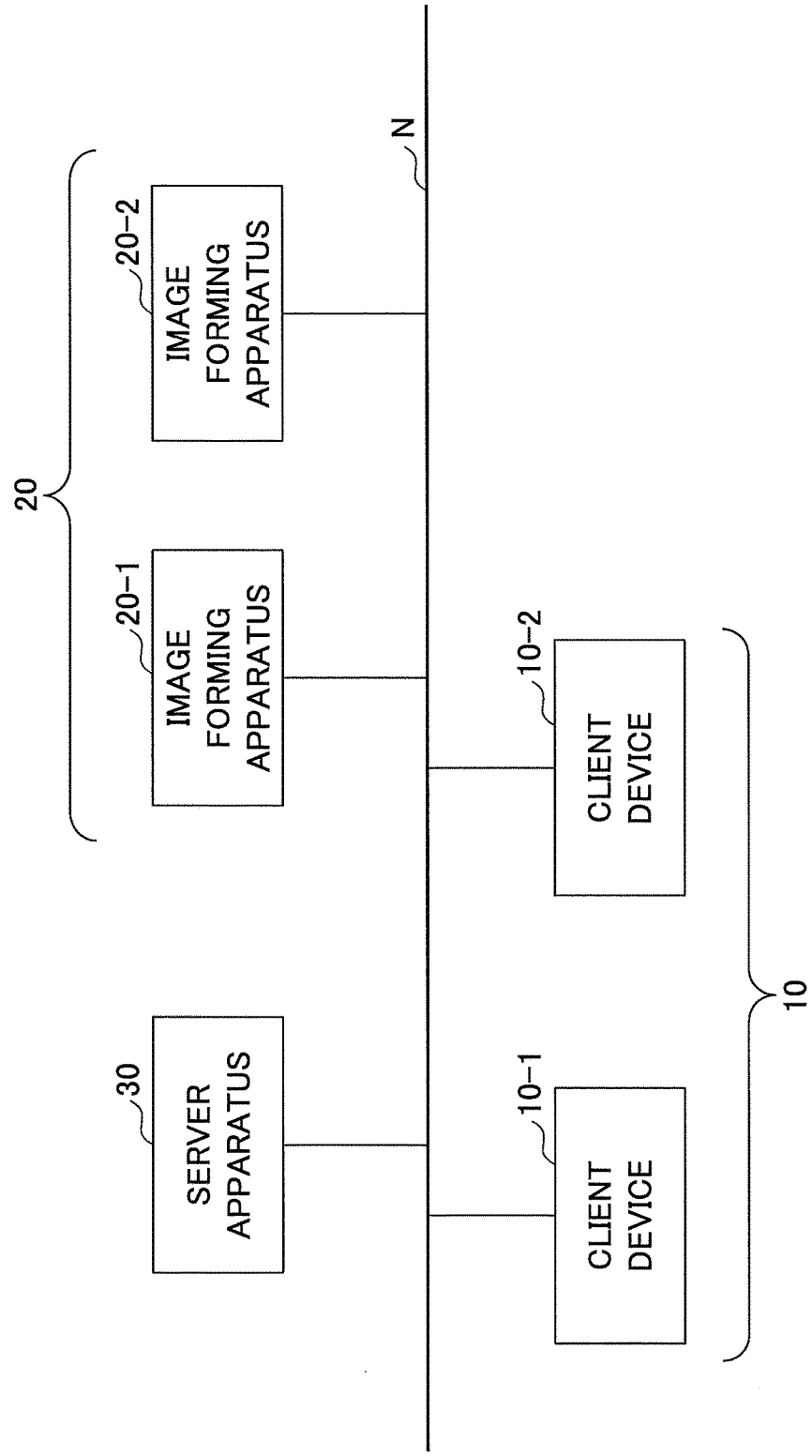
FIG. 1 is a diagram illustrating a system configuration of an example of an information processing system according to an embodiment of the present invention.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (Local Area Network), so that these devices can communicate each other.

The client device 10 may be, for example, a personal computer (PC), a smartphone, or a tablet terminal. Upon receiving, for example, a print instruction from a user, the client device 10 creates print data from data to be printed (print target data), and the client device 10 transmits the print data to the image forming apparatus 20. Alternatively, upon receiving, for example, a print instruction from a user, the client device 10 transmits print target data to the server apparatus 30.

Note that the print target data is, for example, printable electronic data, such as image data and document data. Furthermore, the print data is, for example, electronic data obtained by converting the print target data into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from print target data received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2", for example. Similarly, when the one or more image forming apparatuses 20 are to be distinguished from each other, the one or more image forming apparatuses 20 may be denoted as "image forming apparatus 20-1" and "image forming apparatus 20-2", for example.

<Hardware Configuration>

Figure 2:
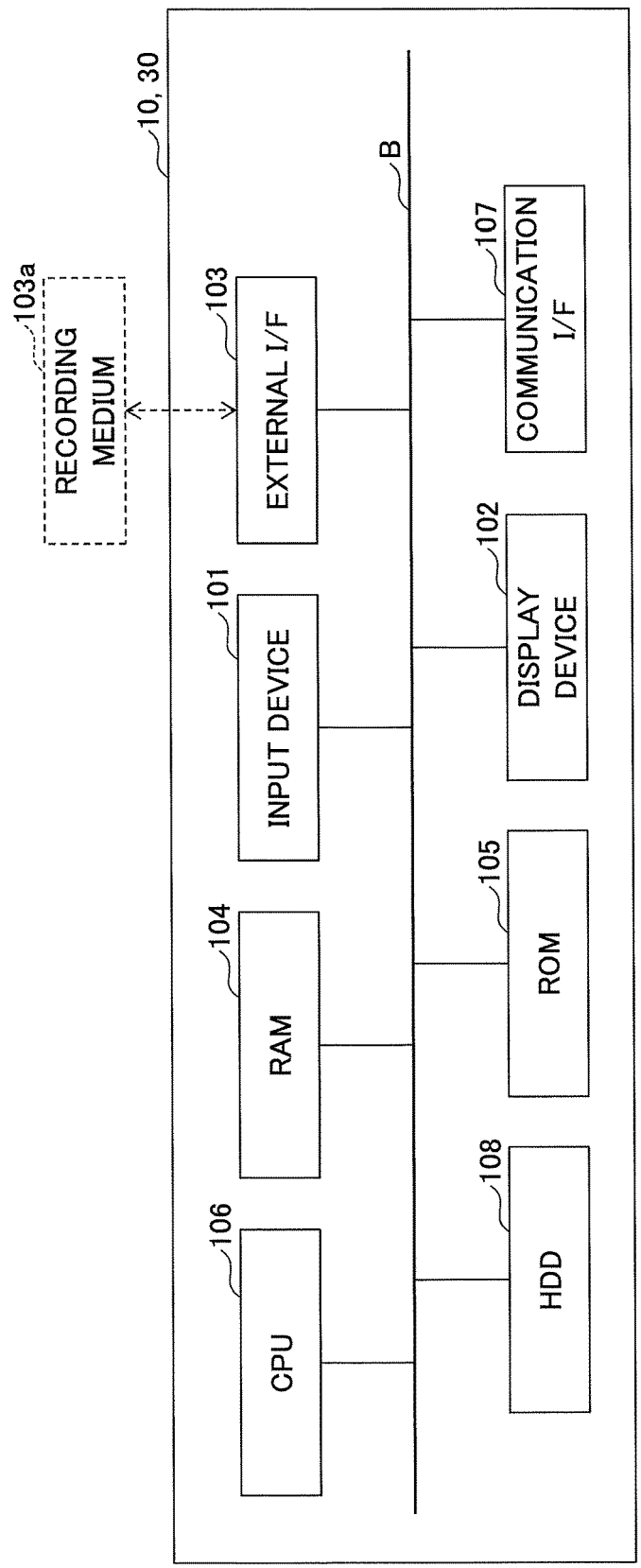
FIG. 2 is a hardware block diagram of an example of each of a client device and a server apparatus according to an embodiment of the present invention.
Figure 3:
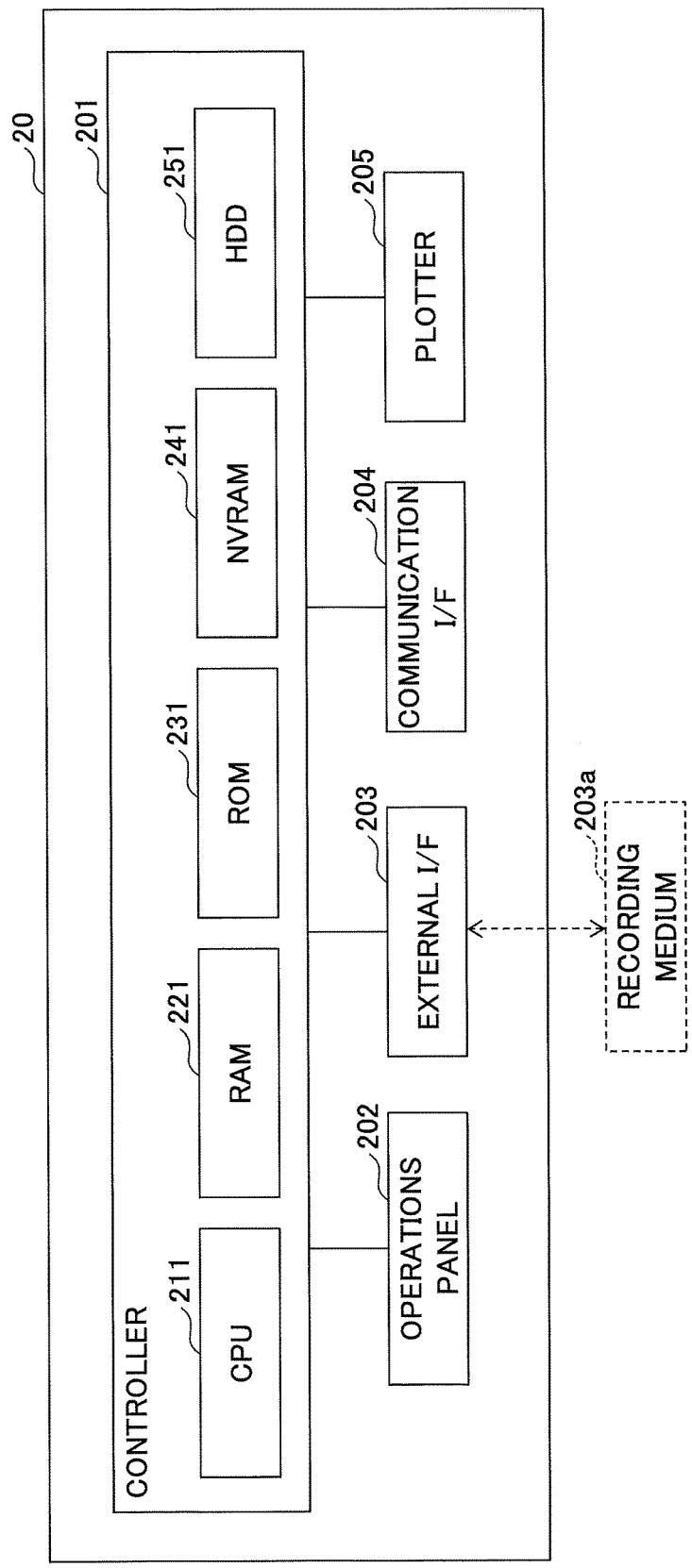
FIG. 3 is a hardware block diagram of an example of an image forming apparatus according to an embodiment of the present invention.

Next, hardware configurations of the client device 10, the image forming apparatus 20, and the server apparatus 30 that are included in the information processing system 1 according to the embodiment are described by referring to FIG. 2 and FIG. 3.

<<The Client Device 10 and the Server Apparatus 30>>

FIG. 2 is a hardware block diagram of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external interface (I/F) 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

<<The Image Forming Apparatus 20>>

FIG. 3 is a hardware block diagram of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, setting information. Furthermore, the HDD 251 is a non-volatile storage device that stores various types of programs and data.

The CPU 211 is a processor that implements overall control and other functions of the image forming apparatus 20 by reading out a program, data, setting information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, and a Universal Serial Bus. (USB) memory.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
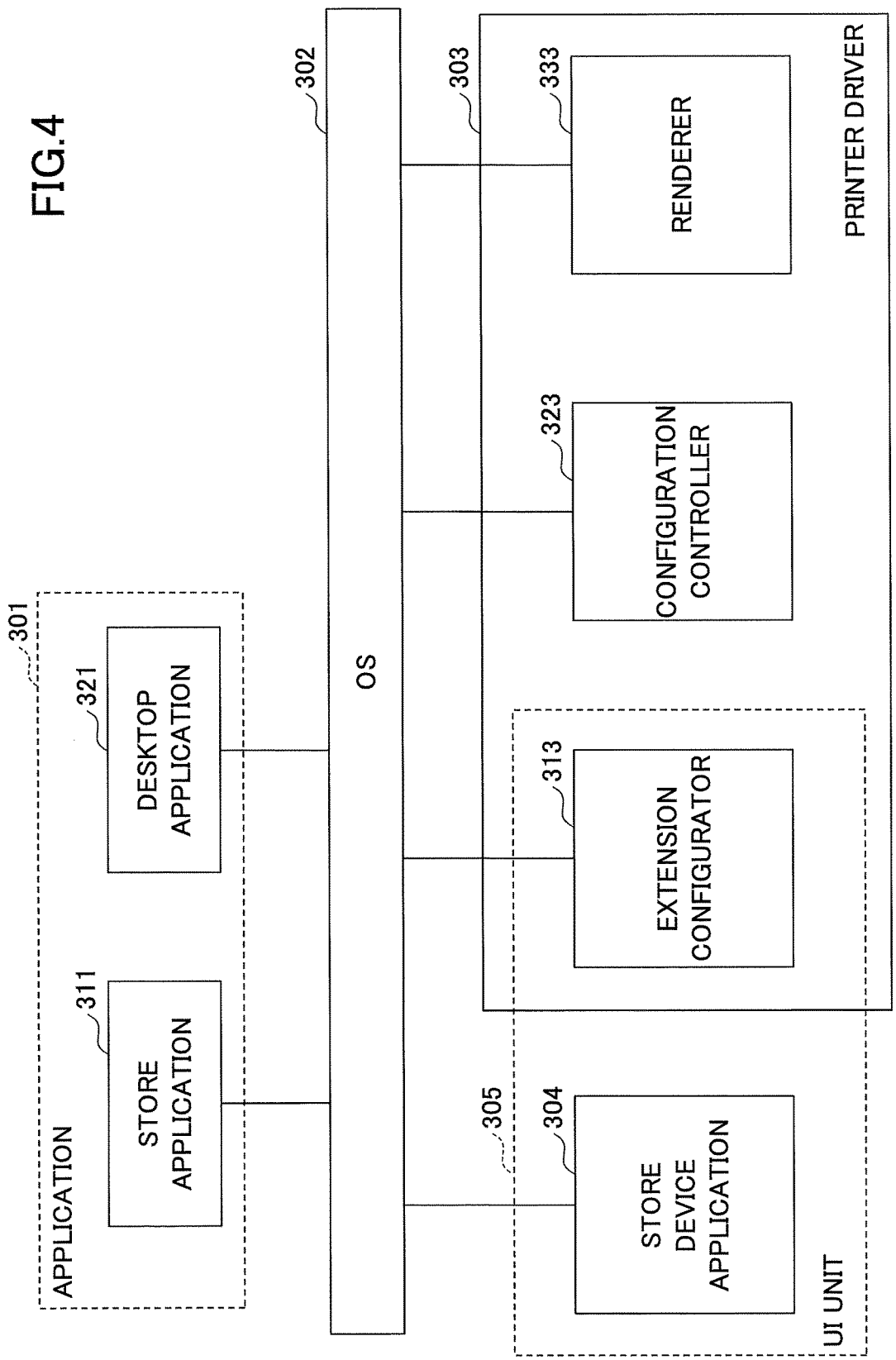
FIG. 4 is a diagram illustrating a software configuration of an example of the client device according to an embodiment of the present invention.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; and a store device application 304.

The application 301 is application software, such as document creation software, image browsing/editing software, and a browser, that is capable of instructing the OS 302 to print, in response to receiving a print instruction from a user. The application 301 includes a store application 311 and a desktop application 321.

The store application 311 is, for example, an application that is available from "Windows Store" that provides applications to Windows (registered trademark) 8/Windows RT and Windows OSs on and subsequent to Windows 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI".

The desktop application 321 is, for example, an application that can be used with a Windows OS on and prior to Windows 7.

The OS 302 is one of the Windows OSs on and subsequent to Windows 8/Windows RT.

The printer driver 303 is, for example, a Version 4 printer driver (which is denoted as "V4 printer driver", hereinafter). A V4 printer driver is based on an architecture adopted from Windows 8/Windows RT. In the following, the printer driver 303 may also be denoted as "V4 printer driver 303".

Note that, in Windows OS on and subsequent to Windows 8, the V4 printer driver can be used, in addition to the Version 3 printer driver (which is denoted as "V3 printer driver" hereinafter), which has been used from Windows 2000 through Windows 7.

The printer driver 303 includes an extension configurator 313; a configuration controller 323 (setting controller); and a renderer 333.

The extension configurator 313 may also be referred to as a printer extension. In response to detecting that the desktop application 321 executes printing, the extension configurator 313 displays a print setting screen specific to a vendor.

The configuration controller 323 may also be referred to as a prohibition (e.g., line-breaking) script. For example, the configuration controller 323 verifies whether a combination of print configurations (print settings) is valid. For example, the extension configurator 313 may hide a combination of print configurations (print settings) that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from Devmode Property Bag, configuration values (setting values) of respective functions configured in the printer driver 303, and the configuration controller 323 returns PrintTicket indicating the retrieved configuration values (setting values). Additionally, the configuration controller 323 stores the configuration values (setting values) indicated by PrintTicket in Devmode Property Bag.

Note that PrintCapability and PrintTicket returned to the OS 302 are used, for example, for displaying present values of respective functions and choices in the print setting screen displayed by the extension configurator 313.

In response to detecting, by the application 301, that a print instruction for printing the print target data is received, the renderer 333 creates print data from the print target data.

Upon detecting that the store application 311 is to perform printing, the store device application 304 displays a print setting screen specific to a vendor. Note that, similar to the store application 311, the store device application 304 is available from "Windows store".

Upon detecting that the desktop application 321 is to perform printing, the printer driver 303 may create print data based on the details of the configuration that are made in the print setting screen displayed by the extension configurator 313. In contrast, upon detecting that the store application 311 is to perform printing, the printer driver 303 may create print data based on the details of the configuration that are made in the print setting screen displayed by the store device application 304.

The extension configurator 313 and the store device application 304 form a UI unit 305 for displaying a print setting screen specific to a vendor.

<Storage Area that can be Accessed by the V4 Printer Driver 303 and the Store Device Application 304>

Figure 5:
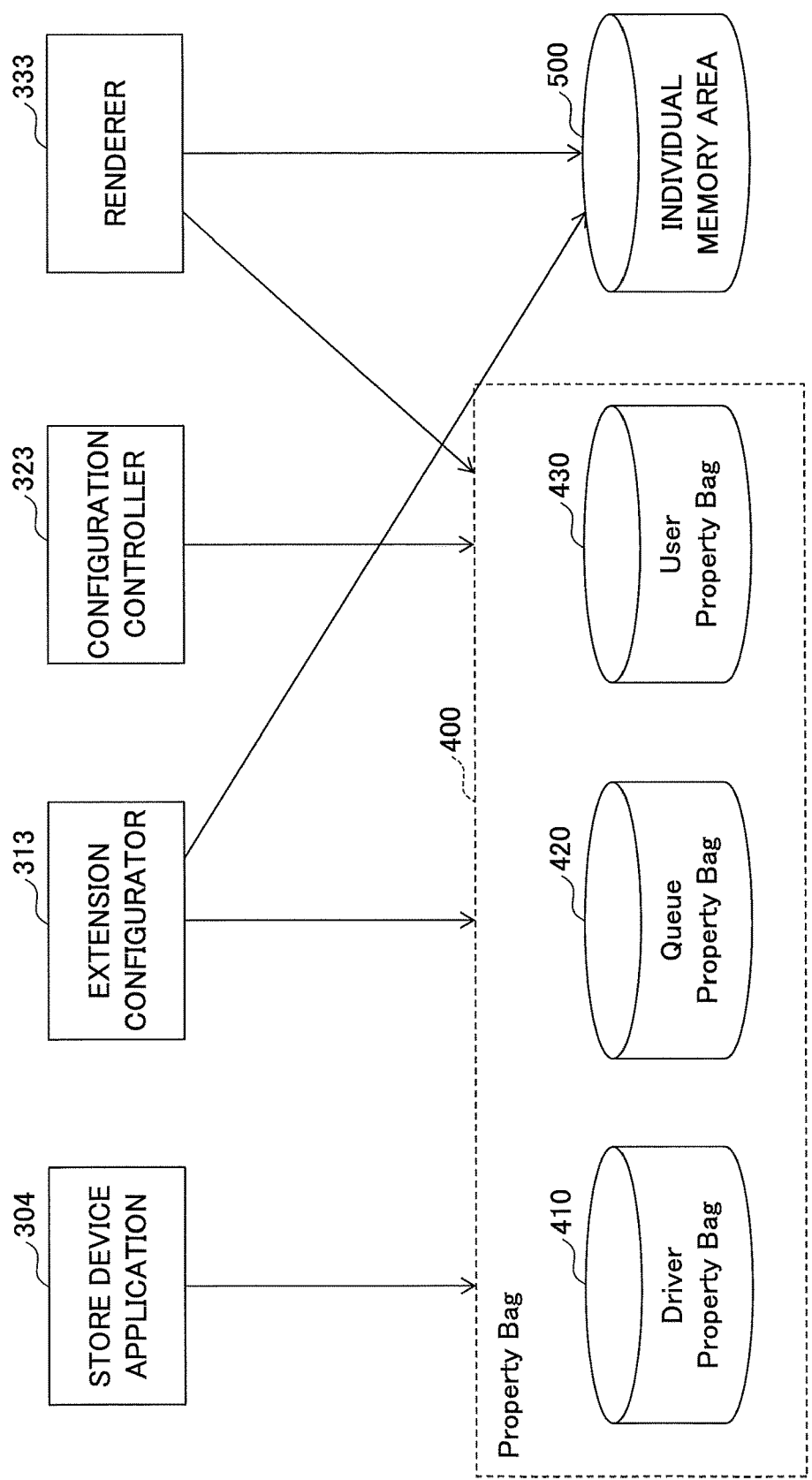
FIG. 5 is a diagram illustrating a storage area accessible by a V4 printer driver and a store device application according to an embodiment of the present invention.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as a Property Bag 400. Note that, such access to the storage area can be executed using an Application Programming Interface (API) provided by the OS 302. As illustrated in FIG. 5, the Property Bag 400 includes a Driver Property Bag 410; a Queue Property Bag 420; and a User Property Bag 430.

The Driver Property Bag 410 is a storage area for storing setting information that is determined upon creating the V4 printer driver 303. The extension configurator 313, the configuration controller 323, the renderer 333, and the store device application 304 are capable of reading out various types of information from the Driver Property Bag 410. However, the extension configurator 313, the configuration controller 323, the renderer 333, and the store device application 304 are incapable of writing information in the Driver Property Bag 410.

The Queue Property Bag 420 is a storage area for storing setting information for each logical printer (printer icon). The extension configurator 313 and the store device application 304 are capable of reading out various types of information from and writing various types of information in the Queue Property Bag 420. Furthermore, the configuration controller 323 and the renderer 333 are capable of reading out various types of information from the Queue Property Bag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The User Property Bag 430 is a storage area that stores, for each logical printer, setting information for each user. The extension configurator 313, the configuration controller 323, and the store device application 304 are capable of reading out various types of information from and writing various types of information in the User Property Bag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the Property Bag 400. The individual memory area 500 is defined by a vendor that provides the V4 printer driver 303.

Due to the restriction applied by the OS 302, the store device application 304 is incapable of accessing a storage area other than the Property Bag 400. Furthermore, the configuration controller 323 is incapable of accessing a storage area other than the Devmode Property Bag and the Property Bag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

[First Embodiment]

<Functional Configuration—First Embodiment>

Figure 6:
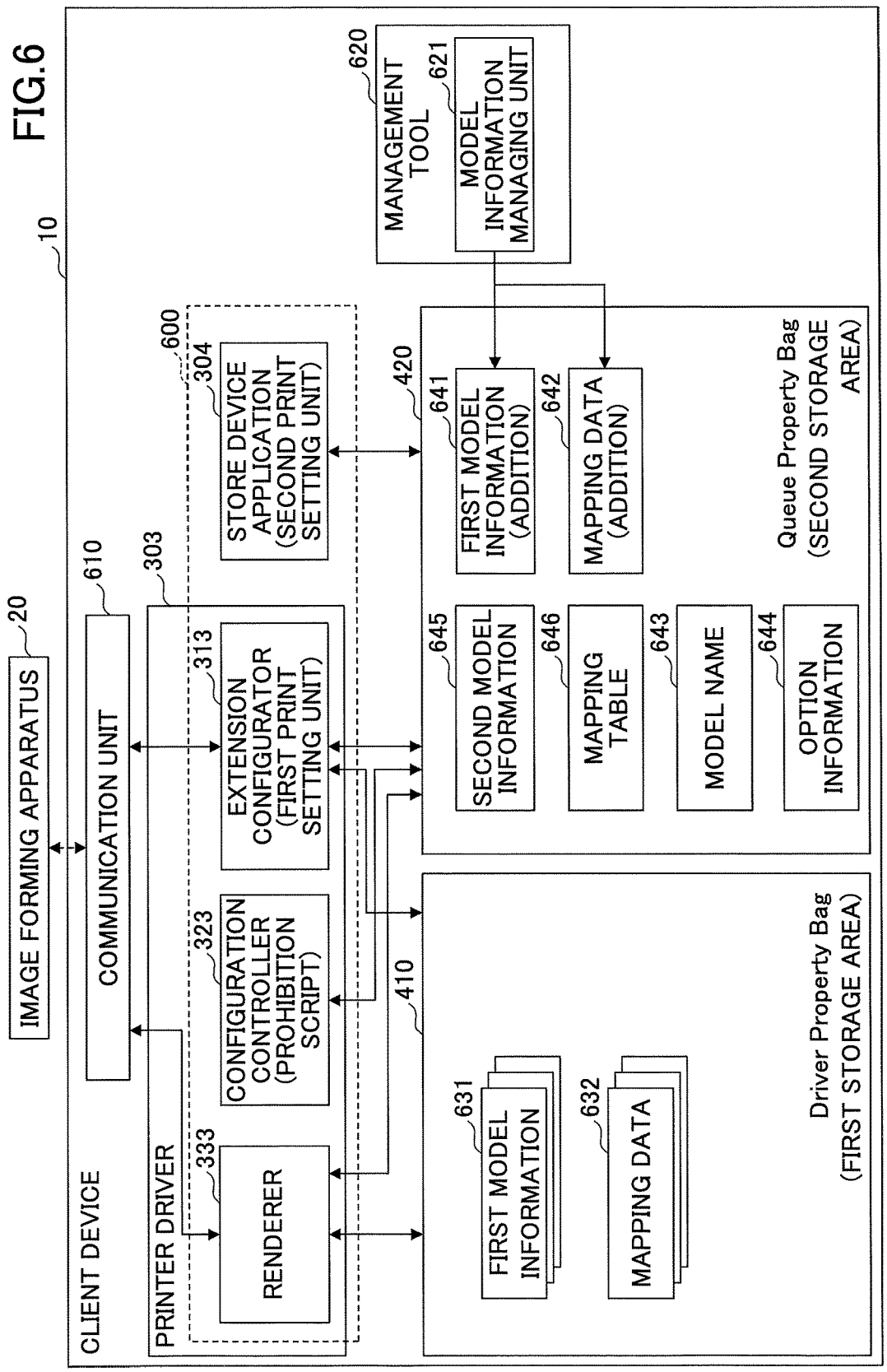
FIG. 6 is a functional block diagram of a client device according to a first embodiment of the present invention.

FIG. 6 is a functional block diagram of the client device according to the first embodiment.

The client device 10 is an information processing apparatus that is connected to the image forming apparatus 20 via the network N, etc., and executes a printer driver (model common driver) corresponding to one or more image forming apparatuses 20.

The client device 10 executes programs such as the OS 302, the printer driver 303, the store device application (second print setting unit) 304, and a management tool (management program) 620, etc.

As described above, the client device 10 implements the extension configurator 313, the configuration controller 323, and the renderer 333, etc., by the printer driver 303 which is the V4 printer driver executed by the CPU 106 in FIG. 2.

Furthermore, the client device 10 implements a model information managing unit 621 by the management tool 620, etc., executed by the CPU 106 in FIG. 2, etc.

Furthermore, the client device 10 implements a communication unit 610 by the OS 302 executed by the CPU 106 of FIG. 2.

The client device 10 also includes storage areas such as the Driver Property Bag 410 and the Queue Property Bag 420.

The Driver Property Bag (hereinafter referred to as a first storage area) 410 stores first model information 631 corresponding to one or more image forming apparatuses 20 usable by the printer driver 303. Note that the information stored in the first storage area 410 cannot be added or changed after the printer driver 303 is installed in the client device 10.

Preferably, the first storage area 410 stores mapping data 632 corresponding to one or more image forming apparatuses 20 usable in the printer driver 303.

The first model information 631 is information of the model of one or more image forming apparatuses 20 registered in the printer driver 303 in advance. The first model information 631 includes, for example, model common information, model individual information, and language information, etc.

The common information and model individual information include setting items, prohibition information relating to setting items that cannot be set at the same time, and information for display of a print setting screen and generating print setting information, etc. Note that the model common information is information that does not depend on the model of the image forming apparatus 20, and the model individual information is information that depends on the model of the image forming apparatus 20.

The common information and model individual information are included in a setting file in which, for example, a function provided for each model, an installable option, a relationship between functions, and a relationship between a function and an option, etc., are defined. This setting file is defined in a format such as Extensible Markup Language (XML) or JavaScript Object Notation (JSON), for example. The same applies to the language information.

Furthermore, an icon for displaying the print setting screen is defined in a format such as bitmap (BMP) or Portable Network Graphics (PNG), for example. The mapping data 632 will be described later.

The Queue Property Bag (hereinafter referred to as a second storage area) 420 can store, by using the management tool 620, the first model information (addition) 641 corresponding to the image forming apparatus 20 usable by the printer driver 303.

Preferably, in the second storage area 420, by using the management tool 620, mapping data (addition) 642 corresponding to the image forming apparatus 20 usable in the printer driver 303 can be stored.

As described above, the information stored in the first storage area 410 cannot be added or changed after the printer driver 303 is installed in the client device 10. Therefore, information such as the first model information (addition) 641 and the mapping data (addition) 642, etc., needs to be stored in the second storage area 420, etc.

The first model information (addition) 641 is information relating to a model of another image forming apparatus 20 that is different from one or more image forming apparatuses 20 registered in the printer driver 303 in advance. The information included in the first model information (addition) 641 is the same as the information included in the first model information 631. Furthermore, in the following description, "first model information" is used when indicating any first model information among the first model information 631 and the first model information (addition) 641.

The mapping data (addition) 642 is mapping data of another image forming apparatus 20 that is different from one or more image forming apparatuses 20 registered in the printer driver 303 in advance. In the following description, "mapping data" is used to indicate any mapping data among the mapping data 632 and the mapping data (addition) 642.

The printer driver 303 according to the present embodiment can control printing by the image forming apparatus 20 corresponding to the first model information (addition) 641, in addition to controlling printing by one or more image forming apparatuses 20 corresponding to first model information 631 registered in the printer driver 303 in advance.

Figure 7:
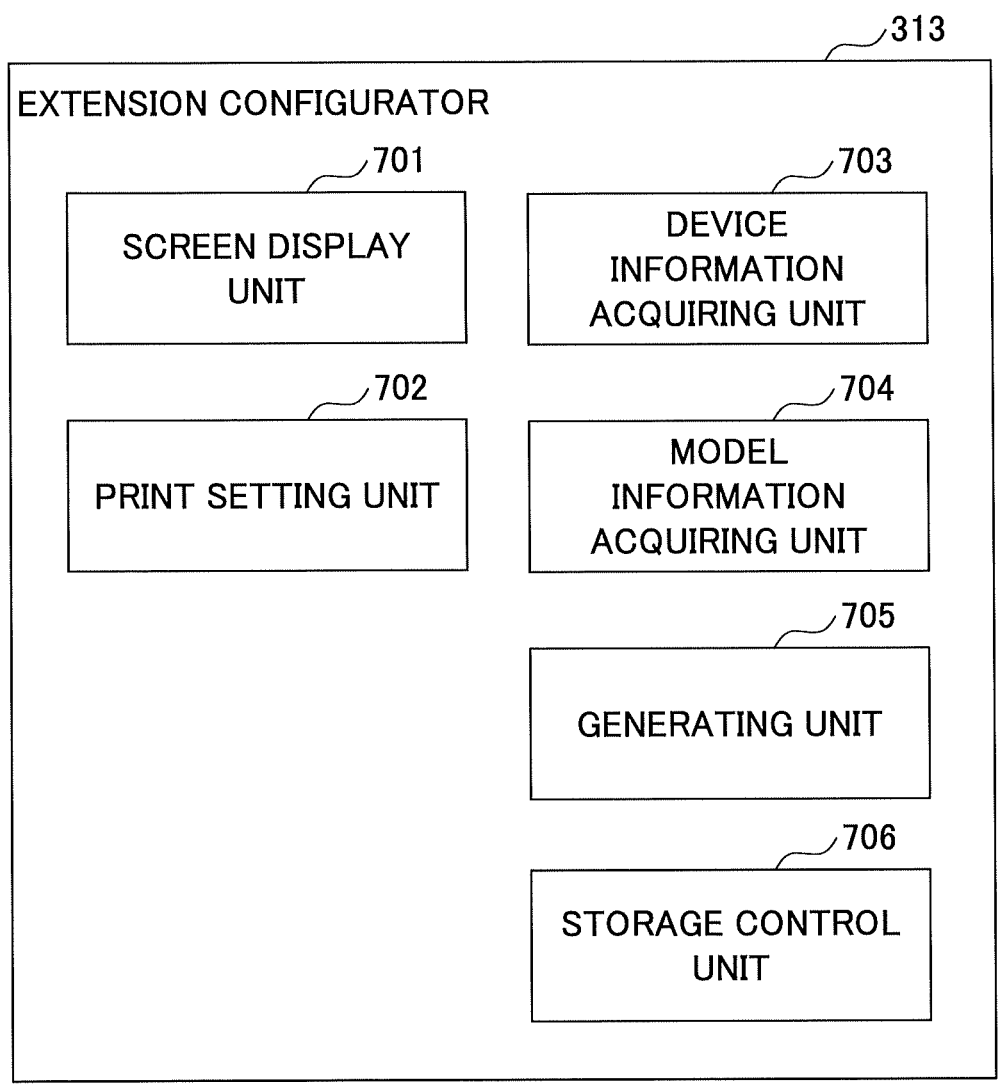
FIG. 7 is a functional block diagram of an extension configurator according to the first embodiment of the present invention.

In order to implement the above functions, the extension configurator 313 of the printer driver 303 according to the present embodiment includes a functional configuration as illustrated in FIG. 7, for example.

FIG. 7 is a functional block diagram of the extension configurator 313 according to the first embodiment. The extension configurator (first print setting unit) 313 includes a screen display unit 701, a print setting unit 702, a device information acquiring unit 703, a model information acquiring unit 704, a generating unit 705, and a storage control unit 706, etc.

The screen display unit 701 displays a first print setting screen, which is a print setting screen for the desktop application 321, on the display device 102, etc., in FIG. 2.

The print setting unit 702 generates print setting information (PrintTicket), for example, based on the information set on the first print setting screen displayed by the screen display unit 701. Furthermore, the print setting unit 702 can make print settings according to the printing capability information (Print Capability) and the capability of the model of the image forming apparatus 20 connected to the client device 10.

Note that the print setting information is information indicating the present print setting value of each setting item set for printing. The setting items are items such as paper size and printing direction, and the print setting values are information items such as A4 (or A3) with respect to the paper size, and a vertical direction (or a horizontal direction) with respect to the printing direction.

Furthermore, the printing capability information indicates a list of information items that can be set for each setting item, and is information indicating usable functions used for displaying options, etc. For example, the printing capability information is information indicating options of an A4 size and a B5 size when the image forming apparatus 20 is capable of printing with an A4 size and a B5 size.

The device information acquiring unit 703 uses the communication unit 610 to communicate with the image forming apparatus 20 connected to the client device 10, and acquires information such as a model name (or model identification information) for identifying the model of the image forming apparatus 20), and option information, etc. Information such as the model name and option information acquired by the device information acquiring unit 703 is stored at model name 643 and option information 644, etc., in the second storage area 420.

Furthermore, the model name 643 and the option information 644 in the second storage area 420 are updated according to the extension configurator 313, the model name of the image forming apparatus 20 selected by the store device application 304, or the option information of the image forming apparatus 20 that has been set, etc.

Note that the model name 643 may be any information by which the model of the image forming apparatus 20 can be identified, and may be information other than a model name (for example, model identification information, etc.).

The option information 644 is information indicating the setting state (or the extended state) of the device. For example, the option information 644 includes information indicating an addition state of a paper eject tray, and an installation state of a unit for implementing a duplex printing function, a unit for implementing a folding function, and the unit for implementing a staple function, etc.

Note that the model name 643 and the option information 644, etc., are examples of the connection destination information including information identifying the model of the image forming apparatus 20.

The model information acquiring unit 704 uses the information stored at the model name 643 in the second storage area 420, to acquire the first model information of the image forming apparatus 20 connected to the client device 10, from the first model information items stored in the first storage area 410 or the second storage area 420.

The generating unit 705 uses the first model information acquired by the model information acquiring unit 704, to generate second model information that can be used by the store device application 304, corresponding to the image forming apparatus 20 connected to the client device 10.

The storage control unit 706 stores the second model information 645 generated by the generating unit 705 in the second storage area.

Similar to the first model information, the second model information is information of the model corresponding to the image forming apparatus 20, and the second model information is generated in a format that can be processed by the store device application 304 and the configuration controller (prohibition script) 323. For example, the second model information is generated in a format that can be processed according to a script language.

Preferably, the second model information is generated to have a data capacity smaller than that of the first model information, by deleting information unnecessary for controlling the client device 10 from the first model information.

As described above, the first model information 631 includes a setting file defining functions provided for each model, options that can be installed, relationships between functions, and relationships between functions and options, etc., and language information and icons for displaying a print setting screen, etc.

Among these information items, the setting file is frequently used by the configuration controller (prohibition script) 323; however, the configuration controller 323 cannot cache the setting file, and high-speed processing is required. Therefore, it is preferable that the generating unit 705 generates a setting file for the second model information 645 having a smaller amount of information, by using the setting file included in the first model information.

FIGS. 8A and 8B are diagrams illustrating images of the model information according to the first embodiment. FIG. 8A illustrates an example of a setting file (capability information) 810 included in the first model information, and FIG. 8B illustrates an example of a setting file 820 included in second model information 645.

The setting file 810 included in the first model information includes, for example, function information 811 of the functions of the model of the image forming apparatus 20, option information 812 of options of the image forming apparatus 20, and static information 813 of the image forming apparatus 20, etc.

For example, the generating unit 705 deletes the information of the functions that cannot be used because the image forming apparatus 20 does not have the corresponding option, among the function information 811 in the setting file 810, and generates function information 821 of the setting file 820 having a smaller amount of information. Here, the options include, for example, the above-described additional paper eject tray, and installed units such as a unit for implementing the duplex printing function, a unit for implementing the folding function, and a unit for implementing the staple function, etc.

Furthermore, the generating unit 705 simplifies information such as prohibition conditions according to options, etc., included in the function information 811 in the setting file 810, and generates the function information 821 in the setting file 820 having a smaller amount of information. For example, in the setting file 810, it is described that an operation A is executed in case of option 1 and an operation B is executed in case of option 2. In this case, when the generating unit 705 determines from the option information 644, etc., that the image forming apparatus 20 has the option 1, the generating unit 705 determines that the description of option 2 is unnecessary, and deletes the description of option 2 from the function information 821 in the setting file 820.

Furthermore, the option information 812 of functions in the setting file 810 is necessary only at the time of making settings, and is unnecessary for processes by the configuration controller 323. For example, the option information 812 is necessary information for displaying a property screen for setting the device itself of the image forming apparatus 20. On the other hand, the option information 812 is unnecessary for the processes by the configuration controller 323 after the present state of the device is determined, or when the store device application 304 generates and displays the print setting screen, etc.

Therefore, for example, the generating unit 705 can delete the option information 812 of the functions in the setting file 810, and generate the setting file 820 having a smaller amount of information.

Furthermore, the generating unit 705 can delete information unnecessary for the processes by the configuration controller 323, among the information included in the static information 813 of the setting file 810. In the example of FIGS. 8A and 8B, the generating unit 705 generates static information 822 in the setting file 820 having a smaller amount of information, leaving only the information of the display language among the static information 813 in the setting file 810.

Returning to FIG. 6, the description of the functional configuration of the client device 10 will be continued.

As described above, the configuration controller (prohibition script) 323 returns PrintCapability indicating information relating to functions that can be set by the printer driver 303, in response to a request from the application 301 or the OS 302, etc. Furthermore, the configuration controller 323 returns PrintTicket indicating setting values of various functions set in the printer driver 303, in response to a request from the application 301 or the OS 302, etc.

As described above, the renderer 333 creates print data from the print target data for which the printing instruction is given by the application 301.

As described above, when performing printing from the store application 311, the store device application 304 displays a print setting screen unique to the vendor.

With the above configuration, even when the image forming apparatus 20 connected to the client device 10 is changed to another model, the client device 10 can use the same printer driver 303 to execute printing with the changed image forming apparatus 20.

Furthermore, when the image forming apparatus 20 connected to the client device 10 is not included among the image forming apparatuses 20 with which the printer driver 303 is compatible, the client device 10 can use the management tool 620 to add the first model Information (addition) 641.

FIG. 9 is a diagram illustrating an example of a display screen of the management tool according to the first embodiment. The model information managing unit 621 of the management tool 620 can display a display screen 900 as illustrated in FIG. 9 on the display device (display unit) 102, etc., in FIG. 2, for example.

For example, when the user selects the printer driver 303 in a pull-down menu 901 in the display screen 900 as illustrated in FIG. 9, the model information managing unit 621 displays, in a selectable manner, information 902 of the compatible image forming apparatuses 20 on the display screen 900.

Furthermore, when adding the first model information (addition) 641 of the image forming apparatus 20 to the client device 10, the user selects a check box 903 corresponding to the image forming apparatus 20 to be added, and selects an "add" button 904 and an "apply" button 906.

Accordingly, the model information managing unit 621 stores the first model information (addition) 641 corresponding to the selected image forming apparatus 20 in the second storage area 420 of the client device 10.

Also, preferably, the model information managing unit 621 stores the mapping data (addition) 642 corresponding to the selected image forming apparatus 20 in the second storage area 420.

(Mapping Table—First Embodiment)

The extension configurator 313 can also store a mapping table 646 in the second storage area 420. The mapping table 646 is information (table) indicating the correspondence relationship between a character string that indicates a function and that is used for an internal process in the printer driver 303 such as the configuration controller 323, etc., and a character string that is used in print setting information and printing capability information.

The mapping table 646 is used upon being acquired from the mapping data 632 stored in the first storage area 410 or the mapping data (addition) 642 stored in the second storage area 420, according to the model name. With such mapping data, it is possible to determine the print setting information and the printing capability information in which the function of each model is to be input and stored.

As an example of this determining process, there is a process of changing, for each model, the print setting information and the printing capability information, to which the options of functions handled inside the printer driver 303 are to be assigned. By this process, for example, in a case where the options of functions handled inside model A are tray 1, tray 2, and a large capacity tray, and the options of functions handled inside model B are tray 1, tray 2, and tray 3, it is possible to describe tray 1, tray 2, and tray 3 in the printing capability information for both models A and B.

Note that similar to the second model information 645, the mapping table 646 preferably has a data format that is easy to process by the store device application 304 and the configuration controller 323 (for example, a text format or a serialized binary format, etc.).

Configuration Controller—First Embodiment

In addition to the process described above, the configuration controller 323 performs an encryption process, for example, when storing security information such as personal information used for a charging process or an authentication process, etc., in the print setting information to be output to the image forming apparatus 20.

Furthermore, the configuration controller 323 can perform a process by using the mapping table 646 stored in the second storage area 420 according to the model name.

On the other hand, the script is merely arranged in the OS 302 without modification, and therefore the configuration controller 323 is in a state where the processes can be seen from outside. Therefore, even in the case of encrypting the information, it is possible to decipher how the encryption is being done from outside, and there is a problem that the security of encryption is lowered. Also, some functions use personal information (user name and password, etc.) that should not be leaked to the outside. Therefore, it is preferable to improve the security by the following method.

First, the extension configurator 313 stores encryption information in the second storage area 420 together with the mapping table 646 when the model is identified. At this time, the encryption information is converted by the extension configurator 313 into a format that is difficult to decipher from the outside, such as a binary format. The encryption information includes an encryption method such as Wired Equivalent Privacy (WEP), Temporal Integrity Protocol (TKIP), and Advanced Encryption Standard (AES), and information used for encryption. The encryption information is described and stored in the second model information 645.

The configuration controller 323 encrypts the personal information by using the encryption information included in the second model information 645, and inserts the encrypted personal information into a corresponding place and generates print setting information including the encrypted personal information. For example, as described above, the security can be improved by holding encryption information in a module that is difficult to decipher from outside, such as the extension configurator 313.

With respect to the encryption method and the information used for encryption, the compatible method differs according to the model. Therefore, at the stage where the image forming apparatus 20 to be connected is determined, the extension configurator 313 can store an encryption logic suitable for the determined image forming apparatus 20, in the mapping table 646. Furthermore, the encryption method and the information used for encryption may be stored for each model in the second storage area 420 instead of in the extension configurator 313, and depending on the selected model, the encryption method to be used and information to be used for encryption can be acquired and applied.

Note that in the above description, an example where the extension configurator 313 holds the encrypted information has been indicated; however, it is also possible to store the encrypted information in a format difficult to decipher from the outside, in the first model information 631. In this case, the extension configurator 313 may acquire the encryption information from the first model information, and generate the second model information 645 including the acquired encryption information. Therefore, in order to improve the security, it is preferable to separately store the encryption method and the arguments included in the encryption information, in the first storage area 410 and in the second storage area 420, respectively.

Note that the configuration controller 323 can acquire the contents of a prohibition process from the first storage area 410 according to the model of the connection destination, without describing the processes of all models. By adopting such a configuration, even when adding a model compatible with the printer driver 303, it is possible to perform updating only by adding model information, without changing the module.

<Process Flow—First Embodiment>

Next, a process flow of the information processing method according to the present embodiment will be described.

(Process by Extension Configurator—First Embodiment)

Figure 10:
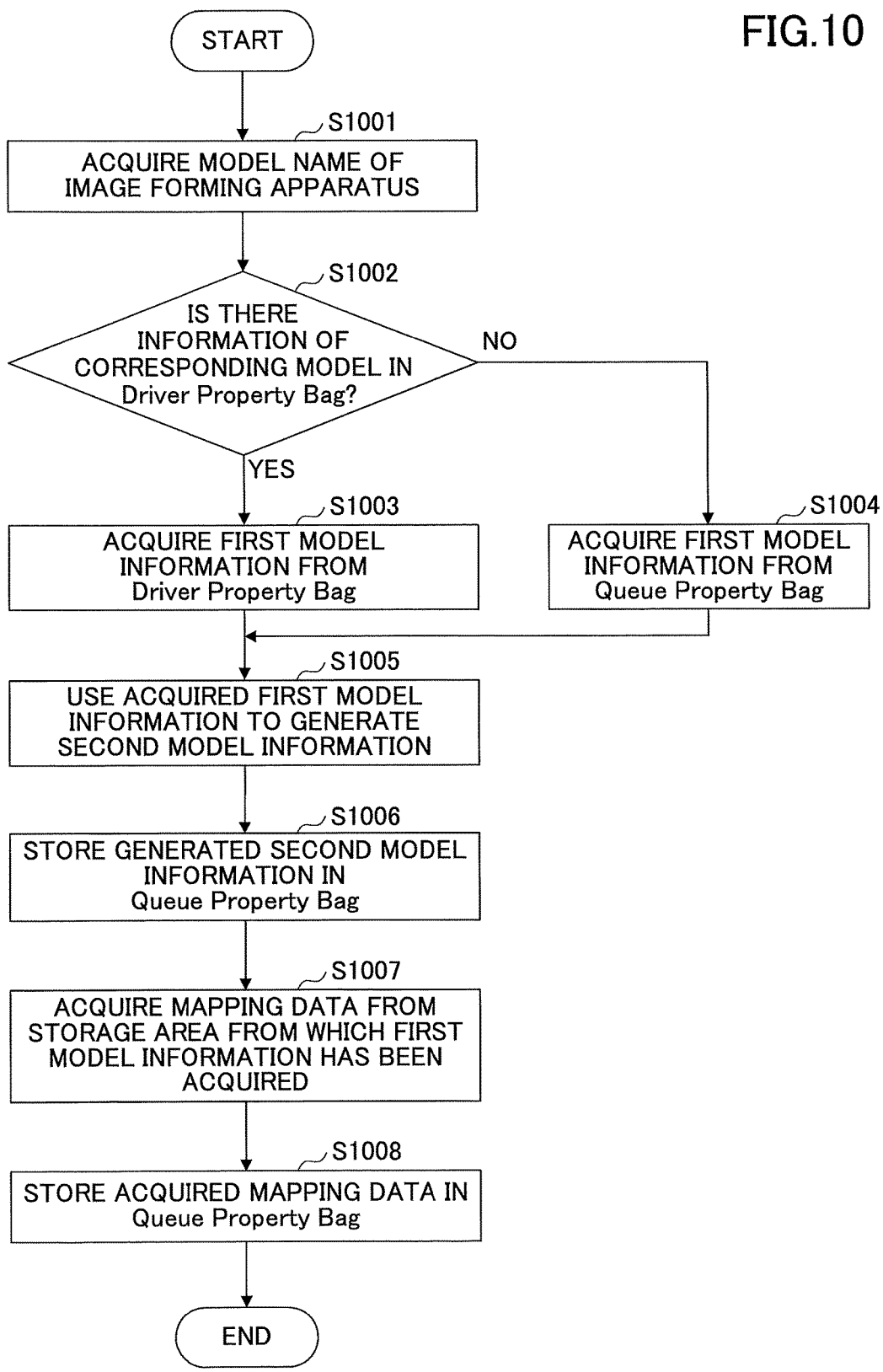
FIG. 10 is a flowchart illustrating an example of a process by an extension configurator according to the first embodiment of the present invention.

FIG. 10 is a flowchart illustrating an example of the process by the extension configurator 313 according to the first embodiment. For example, when the extension configurator 313 is invoked by an installer (to be described later) or when an image setting screen, which is for making print settings for printing a file, is invoked, the extension configurator 313 executes the process illustrated in FIG. 10. Furthermore, the process illustrated in FIG. 10 is executed, for example, when the extension configurator 313 is invoked to display a property screen for making device settings of the image forming apparatus 20, etc. Note that the process illustrated in FIG. 10 does not necessarily have to be executed when the extension configurator 313 is invoked; when the user specifies a model via a UI or when a change in the model is detected by bidirectional communication, the processes from step S1002 and onward may be performed.

In step S1001, the device information acquiring unit 703 of the extension configurator 313 acquires information such as the model name (or the model ID) of the image forming apparatus 20 connected to the client device 10. For example, the device information acquiring unit 703 performs bidirectional communication with the image forming apparatus 20 by using the communication unit 610, and acquires information such as a model name from the image forming apparatus 20. Alternatively, the device information acquiring unit 703 may acquire the model name of the image forming apparatus 20 specified by the user's operation. Note that the acquired information such as the model name, etc., is stored, for example, at the model name 643 in the second storage area 420.

Preferably, at this time, the device information acquiring unit 703 acquires option information of the image forming apparatus 20 connected to the client device 10 and stores the acquired option information, for example, at the option information 644 in the second storage area 420.

In step S1002, the model information acquiring unit 704 of the extension configurator 313 determines whether there is first model information of the image forming apparatus 20 corresponding to the model name, etc., acquired by the device information acquiring unit 703, in the first storage area (Driver Property Bag) 410.

When there is first model information of the corresponding image forming apparatus 20 in the first storage area 410, the model information acquiring unit 704 causes the process to proceed to step S1003. Conversely, when there is no first model information of the corresponding image forming apparatus 20 in the first storage area 410, the model information acquiring unit 704 causes the process to proceed to step S1004.

When the process proceeds to step S1003, the model information acquiring unit 704 acquires, from the first storage area 410, the first model information of the image forming apparatus 20 (the image forming apparatus 20 connected to the client device 10) corresponding to the acquired model name, etc.

Conversely, when the process proceeds to step S1004, the model information acquiring unit 704 acquires the first model information of the image forming apparatus 20 corresponding to the acquired model name, etc., from the second storage area (Queue Property Bag)

Note that as indicated in steps S1002 to S1004 in FIG. 10, the process in which the model information acquiring unit 704 acquires the first model information preferentially from the first storage area 410, is one example.

For example, in step S1002, the model information acquiring unit 704 may determine whether there is first model information of the image forming apparatus 20 corresponding to the acquired model name, etc., in the second storage area 420, and may acquire the first model information preferentially from the area 420. Accordingly, for example, even when the image forming apparatus 20 is already registered in the first model information 631 stored in the first storage area 410, it is possible to update the first model information by storing the first model information (addition) 641 in the second storage area 420.

In step S1005, the generating unit 705 of the extension configurator 313 uses the first model information acquired by the model information acquiring unit 704, to generate the second model information 645 of the image forming apparatus 20 corresponding to the acquired model name, etc., (the image forming apparatus 20 connected to the client device 10).

In step S1006, the storage control unit 706 of the extension configurator 313 stores the generated second model information 645 in the second storage area 420.

In step S1007, the model information acquiring unit 704 of the extension configurator 313 acquires mapping data of the image forming apparatus 20 corresponding to the acquired model name, etc., from the storage area from which the first model information has been acquired in steps S1002 to S1004.

In step S1008, the storage control unit 706 of the extension configurator 313 applies (stores) the acquired mapping data to the mapping table 646 in the second storage area 420.

By the above process, even when the connected image forming apparatus 20 is not included among the image forming apparatuses 20 with which the printer driver 303 is compatible, the client device 10 can use the first model information (addition) 641 to generate the second model information.

(Print Setting Information Output Process—First Embodiment)

Figure 11A:
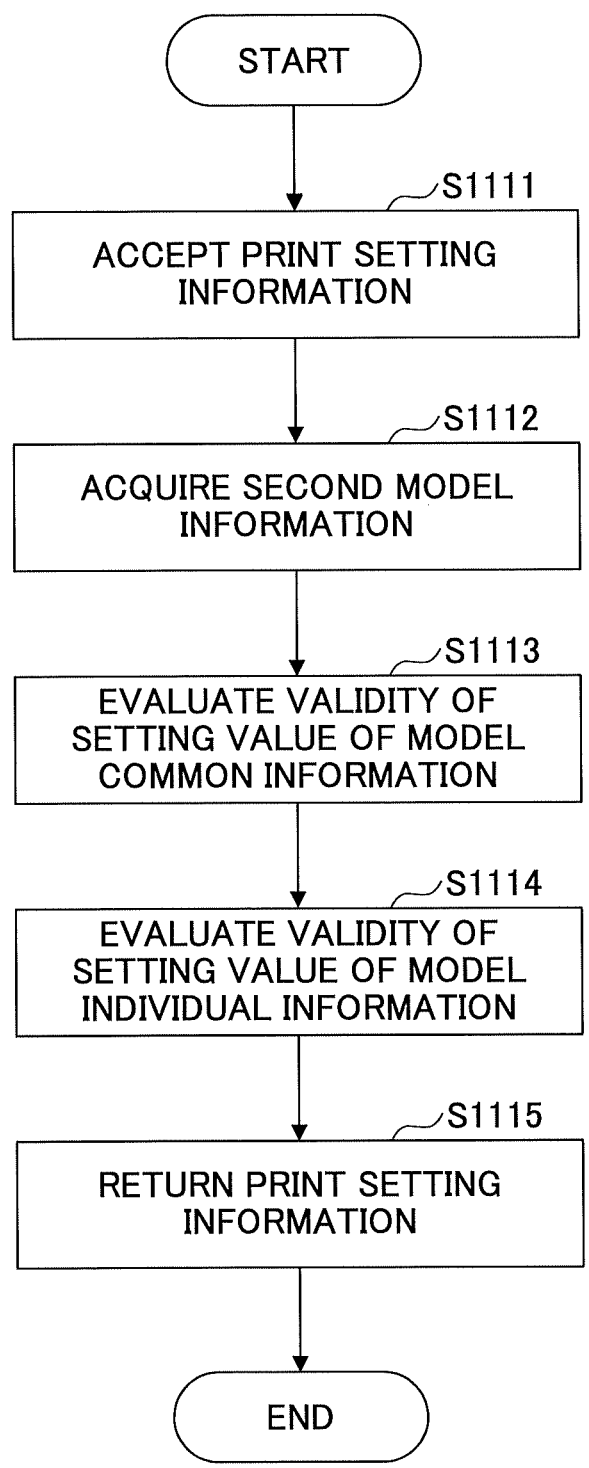
FIG. 11A is a flowchart illustrating an example of a process of outputting print setting information according to the first embodiment of the present invention.

FIG. 11A is a flowchart illustrating an example of a process of outputting print setting information.

Figure 11B:
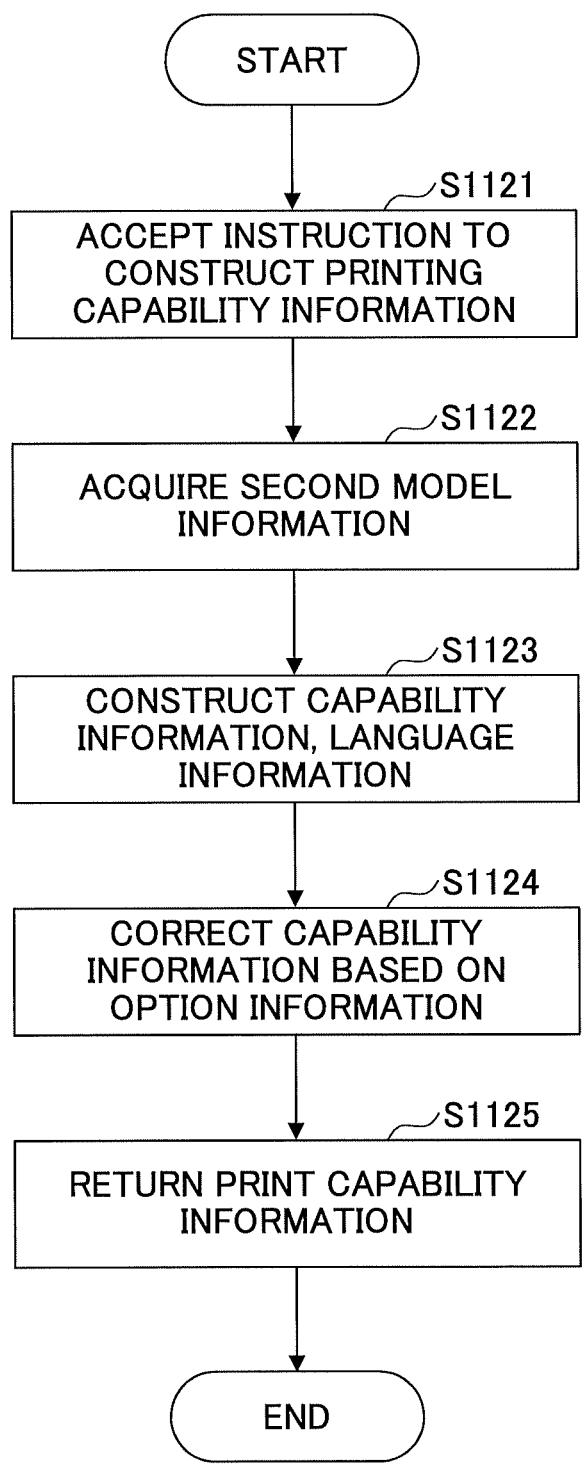
FIG. 11B is a flowchart illustrating an example of a process of outputting printing capability information according to the first embodiment of the present invention.

For example, when the user selects detailed settings ("detailed settings" in the case of Windows Notepad, and "printer properties" in the case of an office application, etc.) from the print settings of the application 301, a print setting screen of the printer driver 303 is invoked. At this time, print setting information (PrintTicket) and printing capability information (PrintCapability) are necessary for making print settings on the print setting screen of the application 301. At this time, a request for the processes illustrated in FIGS. 11A and 11B is issued from the application 301 to the configuration controller 323 via the OS 302.

In step S1111, the configuration controller 323 of the printer driver 303 receives print setting information from the desktop application 321.

In step S1112, the configuration controller 323 acquires the second model information 645 stored in the second storage area 420.

In step S1113, the configuration controller 323 evaluates the validity of the model common information based on the acquired second model information 645. The validity of the model common information is evaluated by confirming whether the setting value of the print setting information that does not depend on the model, i.e., common to the respective image forming apparatuses 20, is a valid value. An example of model common information is, for example, an aggregate setting, etc.

In step S1114, the configuration controller 323 evaluates the validity of the setting value of model individual information based on the acquired second model information 645. The validity of model individual information is evaluated by confirming that the option information and the finishing function, etc., do not exceed the capabilities of the selected image forming apparatus 20 for each print scheme (setting item).

In step S1115, the configuration controller 323 returns the print setting information for which the validity has been evaluated, to the desktop application 321, and ends the process.

(Output Process of Printing Capability Information—First Embodiment)

FIG. 11B is a flowchart illustrating an example of a process of outputting printing capability information. As described above, this is an example of a process of outputting the printing capability information requested from the application 301 via the OS 302 to the configuration controller 323, when the application 301 displays the print setting screen.

In step S1121, the configuration controller 323 receives an instruction to construct the printing capability information, from the desktop application 321.

In step S1122, the configuration controller 323 acquires the second model information 645 stored in the second storage area 420.

In step S1123, the configuration controller 323 constructs printing capability information and language information. In the construction of the printing capability information, options for setting values are constructed for each print scheme. Furthermore, in the construction of the language information, the language information of each setting value is constructed based on the OS 302 and the locale (setting of a country or an area) of the desktop application 321. The language information of a setting value is, for example, information such as "staple, upper right", etc.

In step S1124, the configuration controller 323 corrects the printing capability information constructed in step S1123 based on the option information 644 stored in the second storage area 420. The correction of the capability information is addition or deletion of options of the setting value, etc.

In step S1125, the configuration controller 323 returns the corrected printing capability information to the desktop application 321, and ends the process.

By the processes illustrated in FIGS. 11A and 11B, based on the second model information 645 stored in the second storage area 420, the configuration controller 323 can construct model common information and model individual information according to the image forming apparatus 20 connected to the client device 10.

(Display Process by Store Device Application—First Embodiment)

Figure 11C:
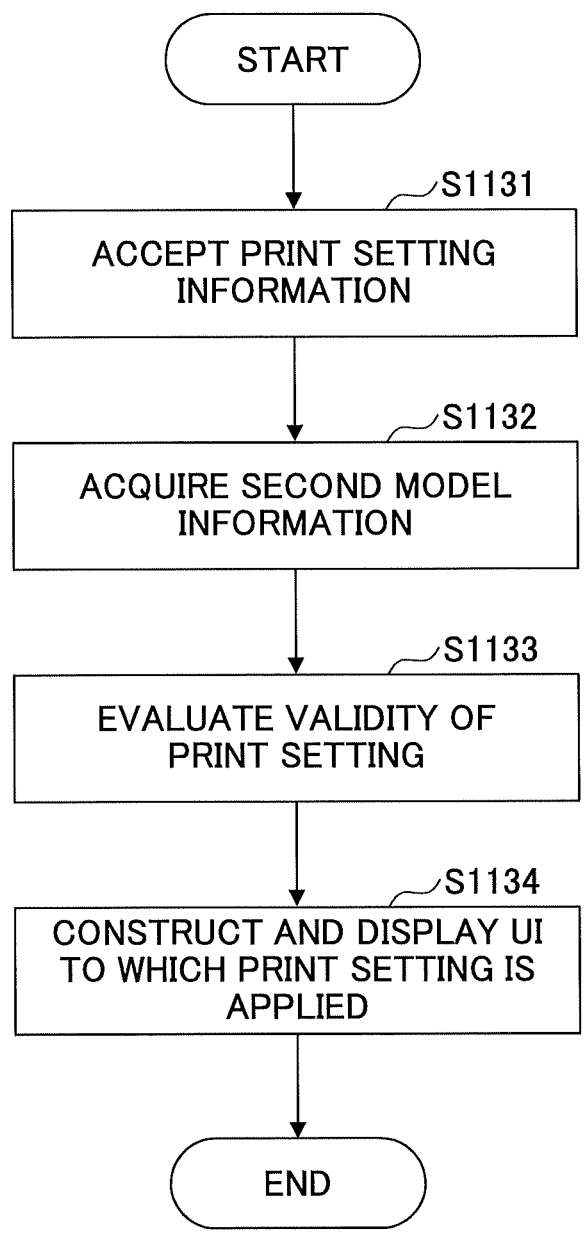
FIG. 11C is a flowchart illustrating an example of a display process by a store device application according to the first embodiment of the present invention.

FIG. 11C is a flowchart illustrating an example of a display process by the store device application 304. This process indicates an example in which the store device application 304 displays the print setting screen.

In step S1131, the store device application 304 accepts the print setting information from the configuration controller 323.

In step S1132, the store device application 304 acquires the second model information 645 stored in the second storage area 420. Note that the second model information 645 includes information (for example, a model name and model identification information, etc.) for identifying the image forming apparatus 20 connected to the client device 10. The second model information 645 is an example of connection destination information including information for identifying the image forming apparatus 20 connected to the client device 10.

In step S1133, the store device application 304 constructs the printing capability information corresponding to the image forming apparatus 20 connected to the client device 10, and evaluates the validity of the print setting information.

In step S1134, the store device application 304 constructs and displays a print setting screen in which the printing information is applied to the printing capability information of the image forming apparatus 20 connected to the client device 10, and ends the process.

By the above process, the store device application 304 can display a print setting screen (second print setting screen) corresponding to the image forming apparatus 20 connected to the client device 10.

In the present embodiment, generation of the second model information is not indispensable. However, since the store device application 304 cannot perform bidirectional communication with the image forming apparatus 20 connected to the client device 10, it is necessary that at least the information of the model name 643 is acquired by the extension configurator 313 and stored in the second storage area 420.

In a case where the second model information is not generated, in step S1132 of FIG. 11C, the store device application 304 acquires the model name 643 stored in the second storage area 420, and identifies first model information corresponding to the acquired model name 643. Furthermore, the store device application 304 uses the option information 644 and the printing capability information together with the identified first model information, to display a print setting screen (second print setting screen) corresponding to the image forming apparatus 20 connected to the client device 10. Note that the information of the model name 643 is another example of the connection destination information including information for identifying the image forming apparatus 20 connected to the client device 10.

(Display Process by Extension Configurator—First Embodiment)

Figure 11D:
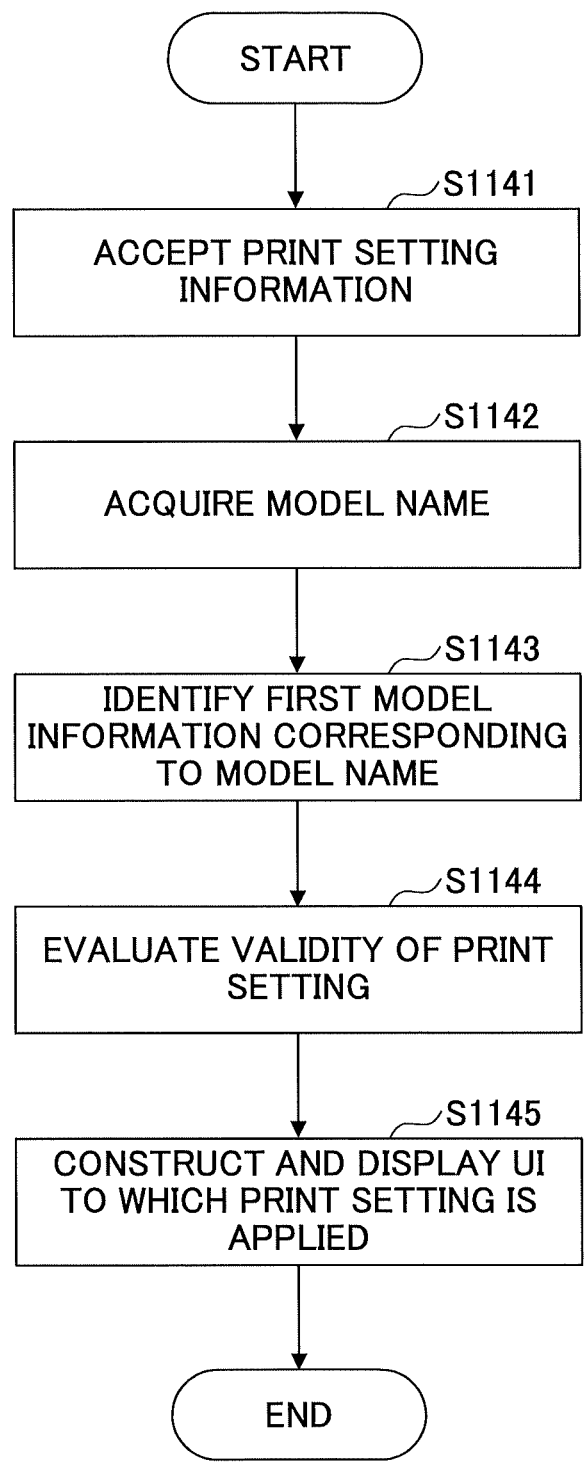
FIG. 11D is a flowchart illustrating an example of a display process by the extension configurator according to the first embodiment of the present invention.

FIG. 11D is a flowchart illustrating an example of a display process by the extension configurator 313. This process is an example in which the extension configurator 313 displays the print setting screen.

In step S1141, the extension configurator 313 accepts print setting information from the configuration controller 323.

In step S1142, the extension configurator 313 acquires the model name 643 stored in the second storage area 420.

In step S1143, the extension configurator 313 identifies the first model information corresponding to the acquired model name 643.

In step S1144, the extension configurator 313 constructs printing capability information corresponding to the image forming apparatus 20 connected to the client device 10, and evaluates the validity of the print setting information.

In step S1145, the extension configurator 313 constructs and displays a print setting screen to which the print setting is applied, by using the identified first model information, the option information 644, and the printing capability information, etc., and ends the process.

By the above process, the extension configurator 313 can display a print setting screen (first print setting screen) corresponding to the image forming apparatus 20 connected to the client device 10.

Note that in the process illustrated in FIG. 11D, when the second model information 645 has been generated and stored in the second storage area 420, similar to the process illustrated in FIG. 11C, the second model information 645 may be used to generate the UI.

Here, it is determined whether to execute the process illustrated in FIG. 11C or the process illustrated in FIG. 11D, depending on whether the application 301 that is the invoking source is the store application 311 or the desktop application 321.

As described above, according to the present embodiment, the extension configurator 313 of the printer driver 303 stores connection destination information including information for identifying the image forming apparatus 20 connected to the client device 10, in the second storage area 420. The store device application 304 of the printer driver 303 displays the print setting screen corresponding to the image forming apparatus 20 connected to the client device 10 by using the connection destination information stored in the second storage area 420.

Therefore, according to the present embodiment, a compatible model can be easily added to the printer driver (V4 printer driver) 303 common to models, that can be used by a plurality of image forming apparatuses 20.

[Second Embodiment]

In the first embodiment, a case where the management tool 620 includes the model information managing unit 621 has been described; however, in the second embodiment, a case where the installer of the printer driver 303 includes the model information managing unit 621 will be described.

<Functional Configuration—Second Embodiment>

FIG. 12 is a functional block diagram of the client device according to the second embodiment. The client device 10 according to the second embodiment illustrated in FIG. 12 includes an installer 1210 instead of the management tool 620 of the client device 10 according to the first embodiment illustrated in FIG. 6.

The installer 1210 is an installation program for installing the printer driver 303 that is a V4 printer driver in the client device 10 so that the printer driver 303 can be used at the client device 10.

The client device 10 implements an installing unit 1211 and the model information managing unit 621, by the installer 1210 executed by the CPU 106 in FIG. 2.

Preferably, the client device 10 implements a customization information managing unit 1212, by the installer 1210 executed by the CPU 106 in FIG. 2.

The installing unit 1211 executes a process of installing a general V4 printer driver, to install the printer driver 303 in the client device 10.

The model information managing unit 621 stores the first model information (addition) 641 in the second storage area 420, in a series of processes executed by the installer 1210.

Preferably, the model information managing unit 621 also stores the mapping data (addition) 642 in the second storage area 420, in a series of processes executed by the installer 1210.

Accordingly, for example, without modifying the printer driver 303 itself, which is a V4 printer driver already authenticated by the vendor of the OS, etc., the first model information (addition) 641 can be used to add a new compatible model.

Preferably, by the customization information managing unit 1212 of the installer 1210 according to the present embodiment, the user (or administrator) can customize (change) the default value of the setting information of the printer driver 303.

Note that the customization of the default value of the setting information means that the user, etc., of the information processing system 1 changes the default value of the setting information when the printer driver 303 is installed in the client device 10. For example, operations for changing print setting information, etc., when using the client device 10 with the printer driver 303 already installed, are not included in customization.

Customizing the default value of the setting information includes, for example, changing the default value of the default color setting from "color" to "monochrome", and restricting or fixing the printing setting by limiting the option of color setting only to "monochrome", etc.

For example, in the series of processes executed by the installer 1210, the customization information managing unit 1212 applies customization information 1213 set in advance by an administrator, etc., in the second model information 645, and sets the second model information 645 as the default value of the setting information of the printer driver 303.

Preferably, the customization information managing unit 1212 accepts a setting of customization by the user etc., and stores the customization information 1213 in which the accepted setting is applied, in the second storage area 420.

Note that the functional configuration of the client device 10 other than the above is similar to the functional configuration of the client device 10 according to the first embodiment illustrated in FIG. 6.

<Process Flow—Second Embodiment>

(Installation Process—Second Embodiment)

FIG. 13 is a sequence diagram illustrating an example of the installation process according to the second embodiment. This process is an example of the installation process executed when the installer 1210 is executed by the client device 10.

In step S1301, the installing unit 1211 of the installer 1210 performs a process of installing a general V4 printer driver, and installs the printer driver 303 in the client device 10.

In step S1302, the installing unit 1211 of the installer 1210 generates a printer icon (logical printer) corresponding to the installed printer driver 303.

In a general V4 printer driver, the installation process is completed only by the processes of steps S1301 and S1302, so that the user can use the printer driver 303 and the image forming apparatus 20 by the client device 10.

Note that a process of installing a general V4 printer driver is a well-known technology, and therefore detailed descriptions will be omitted here.

Note that in a V4 printer driver, when performing the installation process by using functions, etc., of the OS 302 without using the installer prepared by the vendor, there is no invoking of the module of the printer driver during the installation process, and customization and addition of model information cannot be performed. Therefore, it is necessary to use the installer prepared by the vendor and intentionally invoke the module of the printer driver, etc., by the installer.

In step S1303, the model information managing unit 621 of the installer 1210 reads the arrangement information indicating the location where the first model information (addition) 641 and the mapping data (addition) 642, etc., are arranged. Specifically, the second storage area (Queue Property Bag) 420 for storing the first model information (addition) 641 and the mapping data (addition), etc., is implemented by registry of a Windows OS, etc. In the arrangement information, information (for example, a registry entry and a key, etc.) indicating the location for storing the first model information (addition) 641 and the mapping data (addition), etc., is stored.

In step S1304, the model information managing unit 621 of the installer 1210 stores the first model information (addition) 641 and the mapping data (addition) 642, etc., that are incorporated in advance, in the location in the second storage area 420 indicated by the arrangement information. Here, it is assumed that information such as the first model information (addition) 641 and the mapping data (addition) 642, etc., are incorporated in advance, for example, when creating (packaging) the installer 1210.

In step S1305, the model information managing unit 621 of the installer 1210 requests the extension configurator 313 to generate second model information.

In step S1306, the extension configurator 313 executes a process of the extension configurator, for example, as illustrated in FIG. 10. Accordingly, the second model information 645 corresponding to the image forming apparatus 20 connected to the client device 10 is generated and stored in the second storage area 420.

When the installer 1210 includes the customization information managing unit 1212, the customization information managing unit 1212 executes the processes of step S1307 and onward.

In step S1307, the customization information managing unit 1212 of the installer 1210 reads customization information that has been set in advance. The customization information is information such as a value after being changed in a case of changing the initial value (default value) set for each function, or a value after being increased/decreased in a case of increasing/decreasing options that can be set, that is, information of a changed value, etc. For example, the customization information includes information for only performing monochrome printing, in order to allow only monochrome printing in the image forming apparatus 20 capable of performing color printing and monochrome printing. Note that the customization information (change content of the setting information) is assumed to be set in advance, for example, by an administrator, etc., managing the image forming apparatus 20.

In step S1308, the customization information managing unit 1212 of the installer 1210 requests the OS 302 to change the default setting.

In step S1309, the OS 302 requests the configuration controller 323 to check the setting of the customization information.

When the changed value is invalid, the configuration controller 323 returns a notification indicating that the changed value is invalid to the OS 302. The customization information managing unit 1212 of the installer 1210 ends the customization process, for example, upon accepting the notification indicating that the changed value is invalid via the OS 302.

When the changed value of the customization information is valid, the configuration controller 323 returns a notification indicating that the changed value is valid to the OS 302. In this case, the customization information managing unit 1212 of the installer 1210 executes the processes of step S1310 and onward.

In step S1310, the customization information managing unit 1212 of the installer 1210 applies the change of the setting value by the customization information, to the second model information 645 stored in the second storage area 420.

In step S1311, the customization information managing unit 1212 of the installer 1210 stores the customized second model information 645 and the customization information 1213, etc., in the second storage area (QueuePropetyBag) 420.

Note that the information stored in step S1311 needs to be available from the printer driver 303 that has performed the process of step S1306.

Therefore, in step S1311, when storing the information, the customization information managing unit 1212 specifies the printer driver 303 to which the information is related, with respect to the OS 302.

By the above processes, the client device 10 can add a model compatible with the printer driver 303 and customize default settings of the printer driver 303, in a series of processes by the installer 1210 of the printer driver 303.

[Third Embodiment]

The printer driver 303 that is a V4 printer driver common to the models indicated in the first and second embodiments, can control, by one printer driver 303, the printing operations by a plurality of models of the image forming apparatuses 20 connected to the client device 10.

However, depending on the user (including the administrator of the image forming apparatus 20 and the tenant in which the image forming apparatus 20 is installed, etc.), it might be desirable not to use a printer driver common to models, but to use a printer driver of a fixed model.

Therefore, in the third embodiment, an example will be described in which the printer driver 303, which is a V4 printer driver common to a single authenticated model, is caused to function as the printer driver 303 of a fixed model.

<Image of Information Processing System—Third Embodiment>

FIG. 14 is a diagram illustrating an image of the information processing system according to the third embodiment. The distribution mode of the printer driver package for installing the printer driver 303 in the client device 10 can roughly be divided into two modes.

The first mode is a method of registering a printer driver package, in which programs and data, etc., necessary for installing the printer driver 303 are packaged, in a website, etc., of the vender that supplies the OS 302. In this case, for example, the printer driver package cannot include the installer 1210 described in the second embodiment. The installation of the printer driver 303 in the client device 10 is executed, for example, by using functions of the OS 302.

The second mode is a method of registering a printer driver package including the installer 1210 described in the second embodiment, for example, in a website, etc., of the vender that provides the image forming apparatus 20. In this case, for example, the printer driver package can include the installer 1210 described in the second embodiment. The user of the client device 10 can install the printer driver 303 in the client device 10 by executing the installer 1210 included in the printer driver package.

FIG. 14 illustrates an image of the information processing system 1 in the case of providing the client device 10 with the printer driver package including the installer 1210 described in the second embodiment.

The server apparatus 30 is, for example, an information processing apparatus provided by a vendor, etc., of the image forming apparatus 20 and includes, for example, a driver providing unit 1411 that is a web server, etc., for providing a printer driver package to the client device 10.

Furthermore, the server apparatus 30 stores, in advance, the installer 1210, a printer driver package of minimum configuration 1413, and model information 1414a to 1414c of a plurality of models, etc., in a storage unit 1412.

The driver providing unit 1411 provides, for example, a web page for providing a printer driver package to the client device 10, and provides a printer driver package corresponding to a model specified by a user, etc., of the client device 10.

For example, it is assumed that the driver providing unit 1411 accepts a request to acquire the printer driver package of a model B, from the client device 10. In this case, the driver providing unit 1411 acquires, from the storage unit 1412, the installer 1210, the printer driver package of minimum configuration 1413, and the model information 1414b of the model B for which the request has been accepted, and creates a printer driver package 1423 of the model B.

The client device 10 includes, for example, a driver acquiring unit 1421 (for example, a web browser, etc.) for acquiring a printer driver package from the server apparatus 30. The user of the client device 10 performs an operation of downloading the printer driver of the model B, for example, from the web server provided by the driver providing unit 1411, by using the driver acquiring unit 1421. Accordingly, the client device 10 can download the printer driver package 1423 of the model B from the driver providing unit 1411 of the server apparatus 30, and store the printer driver package 1423 in a storage unit 1422.

The printer driver package 1423 of the model B includes, for example, the installer 1210, the printer driver package of minimum configuration 1413, and the model information 1414b of the model B, etc.

As described in the second embodiment, the installer 1210 is an installation program for installing the printer driver 303 in the client device 10.

Figure 15:
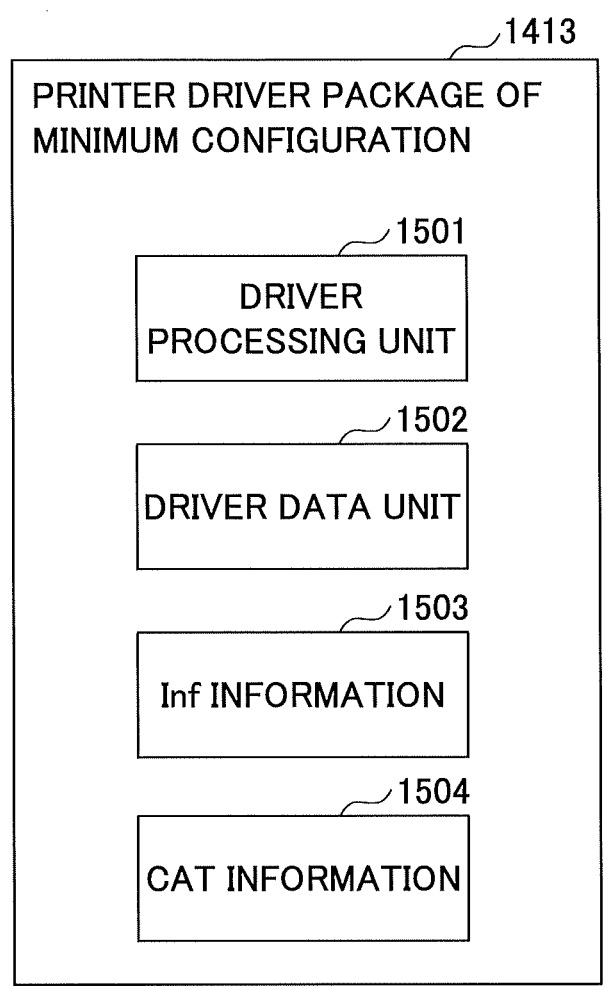
FIG. 15 is a diagram illustrating an example of a printer driver package of minimum configuration according to the third embodiment of the present invention.

For example, as illustrated in FIG. 15, the printer driver package of minimum configuration 1413 includes a driver processing unit 1501, a driver data unit 1502, inf information 1503, and catalog (CAT) information 1504, etc. The printer driver package of minimum configuration 1413 is a driver package that has passed a certification test of Microsoft (registered trademark) corporation and that is authenticated. In the present embodiment, only the printer driver package of minimum configuration 1413 as illustrated in FIG. 15 is authenticated, and printer driver packages including the model information 1414a to 1414c of a plurality of models such as the printer driver package 1423 of the model B, have not been authenticated.

The driver processing unit 1501 is a group of executable files (exe file and dll file, etc.) of the driver.

The driver data unit 1502 is a group of setting files used in processes of the driver, and includes, for example, model common information, etc. The information included in the driver data unit 1502 is information such as the first model information 631 and the mapping data 632, etc., included in the first storage area (Driver Property Bag) 410 of FIG. 6, for example. Here, the number of pieces of the first model information 631 and the mapping data 632 included in the driver data unit 1502 varies depending on the operation.

For example, assuming that the first model information (addition) 641 and the mapping data (addition) 642, etc., are added later to the driver data unit 1502, information such as the first model information 631 and the mapping data 632, etc., may not be included in the driver data unit 1502.

Furthermore, the driver data unit 1502 may include one piece each of the first model information 631 and the mapping data 632, etc., describing information common functions included in multiple drivers.

Furthermore, the driver data unit 1502 may include, for example, the first model information 631 and the mapping data 632, etc., of a plurality of models that are frequently used.

The inf information 1503 is a configuration information file of the driver, and for example, information items of all files included in the printer driver package of minimum configuration 1413, are listed.

The CAT information 1504 is an authentication file. For example, the CAT information 1504 includes a hash value of a file group included in the printer driver package of minimum configuration 1413, and certifies that this set has passed the authentication test. Therefore, if even a part of the file included in the printer driver package of minimum configuration 1413 is changed, it is necessary to undergo the authentication test again by the configuration after being changed.

Note that when installing a driver package for which a certification file has not been acquired yet, or a driver package for which a certification file has been acquired but whose package content has been changed, a warning screen indicating that the certification file is not valid is displayed by the OS 302.

In the above configuration, for example, by the printer driver installation process as indicated in step S1301 of FIG. 13, the arrangement of each unit of the printer driver 303 in the client device 10 and the information to be stored in the first storage area 410 are determined. Furthermore, only these parts are recognized by the OS 302 as an "installation process", and only the printer driver package of minimum configuration 1413 is used for this process.

Therefore, for example, in the installation process of FIG. 19 to be described later, the installer 1210 merely adds the model information 1414b of the model B, etc., after the "installation process", so that even when an attempt is made to install a tampered printer driver package, this tampered printer driver package will not be recognized by the OS 302. Thus, in the installation process according to the present embodiment illustrated in FIG. 19, the OS 302 will not display the above-described warning screen indicating that the certification file is not valid.

As described above, according to the embodiments of the present invention, it is possible to fix, add, or delete, etc., a compatible model in the printer driver 303 that is a V4 printer driver common to models, without changing the printer driver package of minimum configuration 1413.

<Functional Configuration—Third Embodiment>

Figure 16:
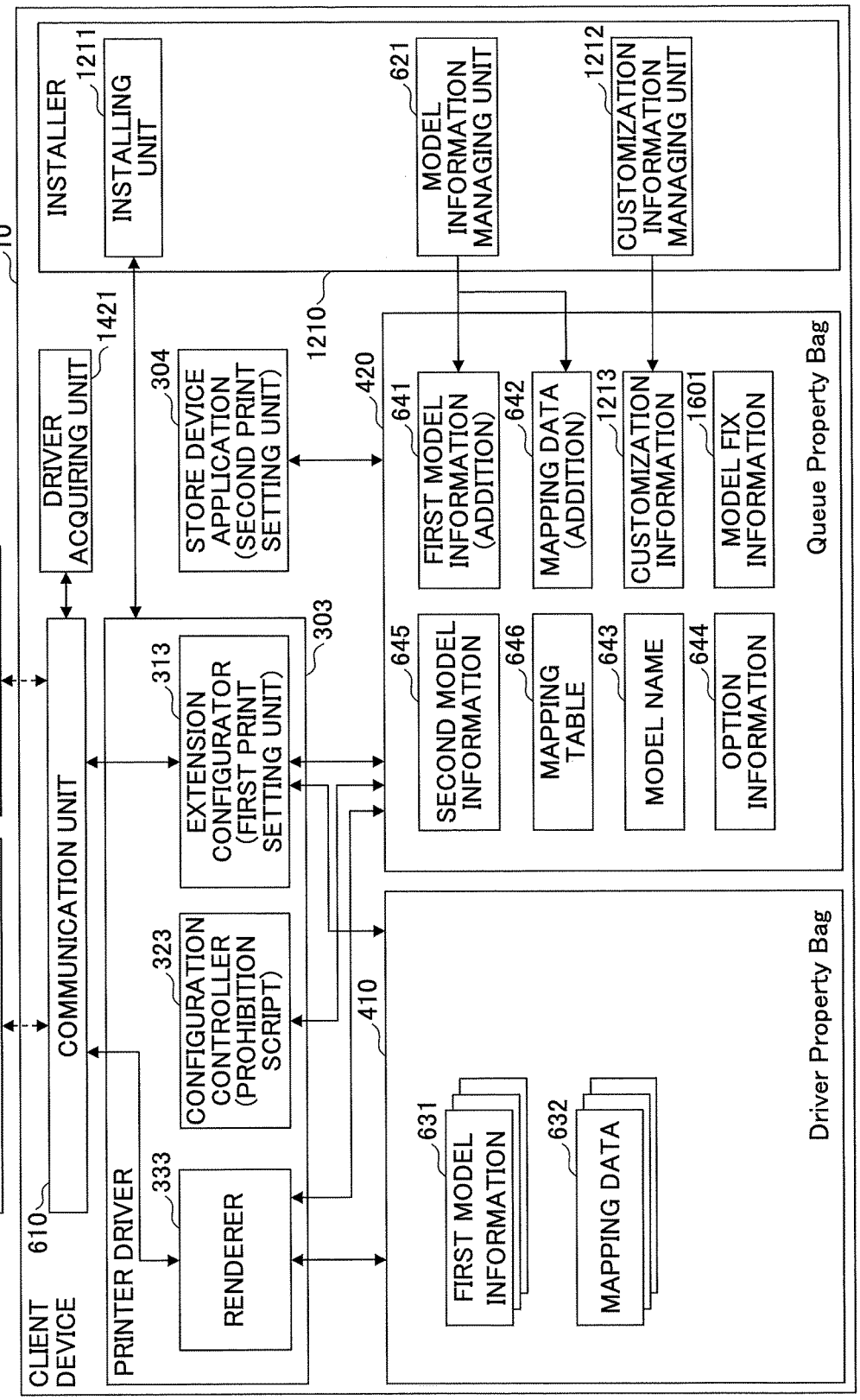
FIG. 16 is a functional block diagram of the client device according to the third embodiment of the present invention.

FIG. 16 is a functional block diagram of the client device 10 according to the third embodiment. The client device 10 according to the third embodiment illustrated in FIG. 16 includes the driver acquiring unit 1421 in addition to the functional configuration of the client device 10 according to the second embodiment illustrated in FIG. 12.

The second storage area 420 stores model fix information 1601 that is information that can be set as valid or invalid by an operation by the user of the client device 10, etc.

The driver acquiring unit 1421 is implemented by a program executed by the CPU 106 in FIG. 2, for example, and acquires a printer driver package for installing the printer driver 303 from the server apparatus 30, and stores the printer driver package in the storage unit 1422, etc.

For example, the model fix information 1601 is set to be valid by selecting a "fix model" check box 1701 displayed on a setting screen 1700 of the printer driver 303 that is a V4 printer driver common to models as illustrated in FIG. 17. Furthermore, the model fix information 1601 is set to be invalid, by canceling the selection of the "fix model" check box 1701 displayed on the setting screen 1700, etc.

The model fix information 1601 may be set to be valid or invalid by, for example, the installer 1210, etc.

The printer driver 303 that is a V4 printer driver common to models according to the present embodiment can operate as a printer driver exclusively used for a model, by setting the model fix information 1601 to be valid. Furthermore, the printer driver 303 operates as a printer driver common to models by setting the model fix information 1601 to be invalid.

The functional configuration other than the above configuration is the same as that of the client device 10 according to the second embodiment illustrated in FIG. 12.

<Process Flow—Third Embodiment>

(Installer Acquisition Process—Third Embodiment)

Figure 18:
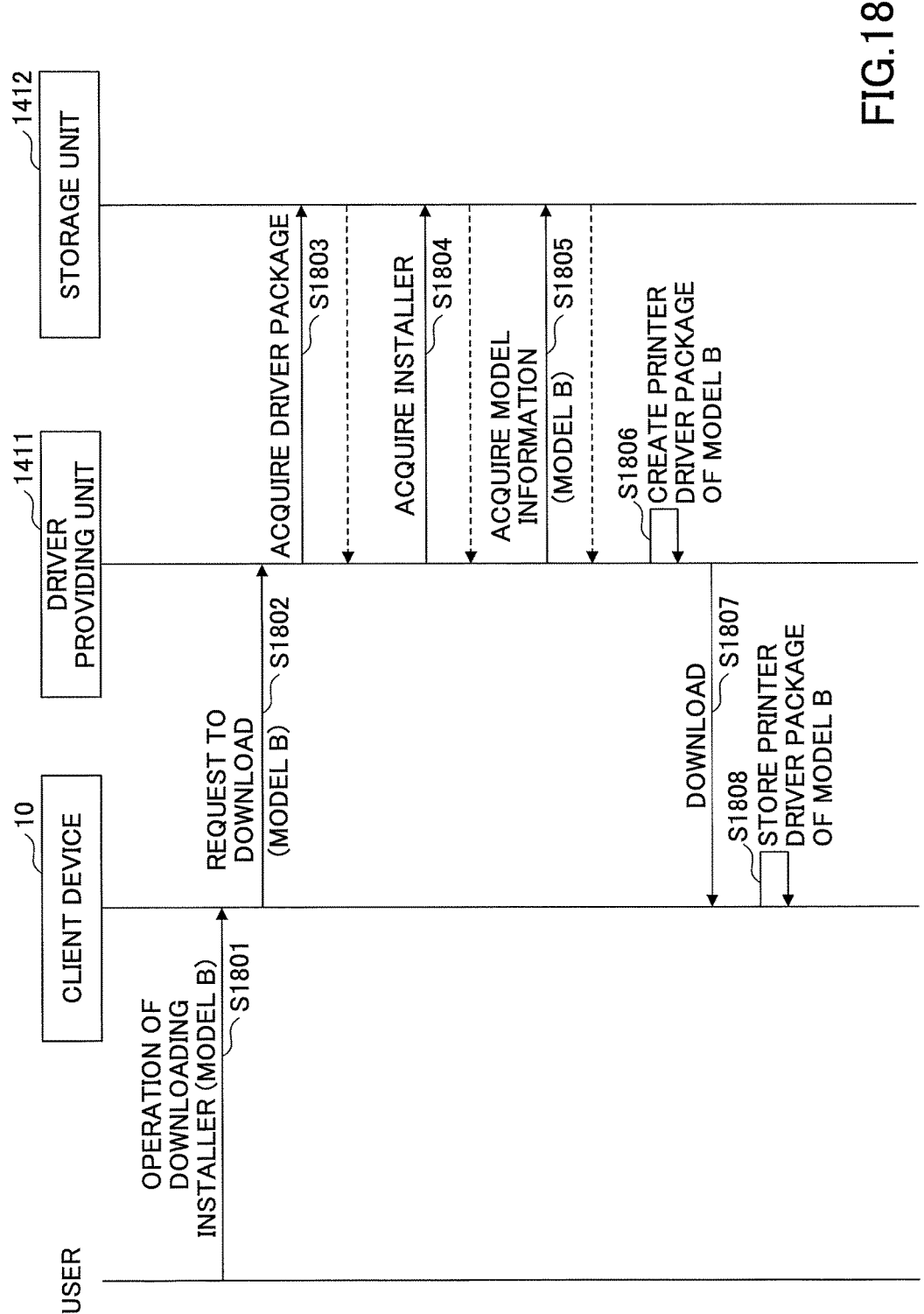
FIG. 18 is a sequence diagram illustrating an example of an installer acquisition process according to the third embodiment of the present invention.

FIG. 18 is a sequence diagram illustrating an example of an installer acquisition process according to the third embodiment. This process indicates an example of a process in which the client device 10 acquires the printer driver package 1423 of the model B from the server apparatus 30 (as an example), in FIG. 14.

In step S1801, the user of the client device 10 performs an operation of downloading the installer of the model B by using the driver acquiring unit 1421 (for example, a web browser, etc.) of the client device 10.

In step S1802, the driver acquiring unit 1421 of the client device 10 transmits a download request to the driver providing unit 1411 of the server apparatus 30 according to an operation by the user. The download request includes information indicating the model B selected by the user.

In steps S1803 to S1805, the driver providing unit 1411 of the server apparatus 30 acquires the installer 1210, the printer driver package of minimum configuration 1413, and the model information 1414b of the model B from, for example, the storage unit 1412 of FIG. 14.

In step S1806, the driver providing unit 1411 of the server apparatus 30 creates the printer driver package 1423 of the model B as illustrated in FIG. 14, for example.

In step S1807, the driver acquiring unit 1421 of the client device 10 downloads the created printer driver package 1423 of the model B from the driver providing unit 1411 of the server apparatus 30.

In step S1808, the driver acquiring unit 1421 of the client device 10 stores the downloaded printer driver package 1423 of the model B in the storage unit 1422 illustrated in FIG. 14.

Figure 19:
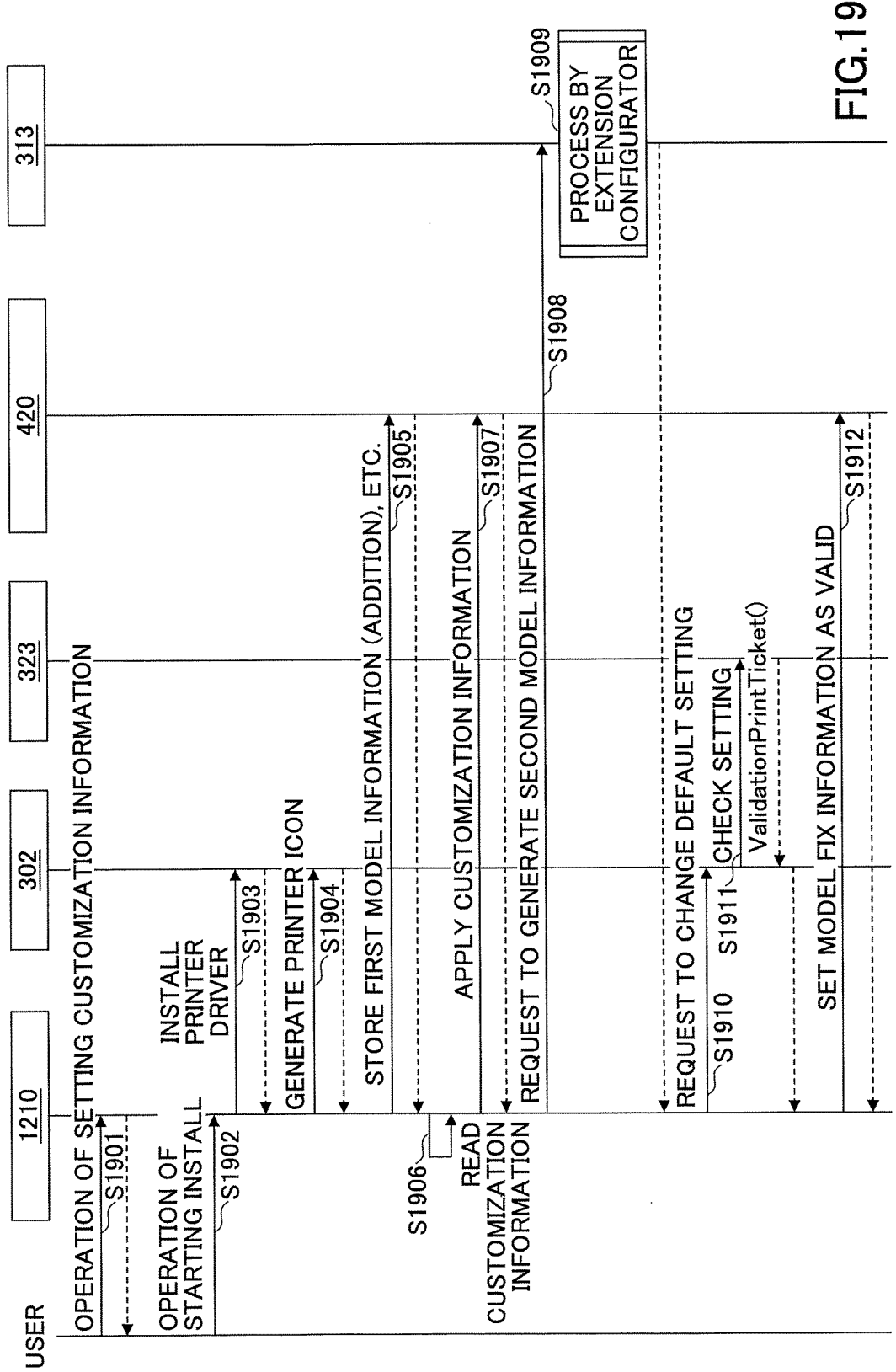
FIG. 19 is a sequence diagram illustrating an example of an installation process according to the third embodiment of the present invention.

In this state, as the user executes the installer 1210, for example, an installation process 1 as illustrated in FIG. 19 is executed.

Note that the process of acquiring the installer illustrated in FIG. 18 is one example. For example, in the storage unit 1412 of the server apparatus 30, a printer driver package for each model may be stored in advance.

(Installation Process 1—Third Embodiment)

FIG. 19 is a sequence diagram illustrating an example of an installation process according to the third embodiment. This process is an example of an installation process executed when the user executes the installer 1210 in the client device 10 illustrated in FIG. 14, for example.

In step S1901, the user (or administrator) performs an operation of setting customization information (restricting a function and changing a default value, etc.). For example, the customization information managing unit 1212 of the installer 1210 causes the display device 102 of FIG. 2 to display a screen for setting customization information and accepts an operation for setting customization information by the user.

At this time, the user can set the validity or the invalidity of the model fix information 1601. Note that in step S1801 of FIG. 18, when the printer driver package of a particular model is downloaded, the model fix information may be automatically set as valid. Furthermore, when customization is not performed, the process of step S1901 can be omitted.

In step S1902, the user performs an operation to start the installation.

In step S1903, the installing unit 1211 of the installer 1210 performs a process of installing a general V4 printer driver, and installs the printer driver 303 in the client device 10.

In step S1904, the installing unit 1211 of the installer 1210 generates a printer icon (logical printer) corresponding to the installed printer driver 303.

Preferably, when the model fix information 1601 is set as valid in step S1901, the installing unit 1211 changes the name (logical printer name) of the printer icon to, for example, a name corresponding to the model B.

In step S1905, the model information managing unit 621 of the installer 1210 stores the first model information (addition) 641 and the mapping data (addition) 642, etc., included in the model information 1414b of the model B, in the second storage area 420.

In step S1906, the customization information managing unit 1212 of the installer 1210 reads, for example, the customization information set in step S1901.

In step S1907, the customization information managing unit 1212 of the installer 1210 applies the customization information to the printer driver 303.

In step S1908, the customization information managing unit 1212 of the installer 1210 requests the extension configurator 313 to generate second model information.

In step S1909, the extension configurator 313 executes a process of the extension configurator, for example, as illustrated in FIG. 10. Accordingly, the second model information 645 corresponding to the model B is generated and stored in the second storage area 420.

In step S1910, the customization information managing unit 1212 of the installer 1210 requests the OS 302 to change the default setting, for example, using an Application Programming Interface (API) prepared in advance.

In step S1911, the OS 302 requests the configuration controller 323 to perform setting check. Accordingly, print setting information (PrintTicket) and printing capability information (PrintCapability) are returned from the configuration controller 323, and the default value of the printer driver 303 is determined.

In step S1912, for example, when the model fix information 1601 is set to be valid in step S1901, the customization information managing unit 1212 of the installer 1210 sets the model fix information 1601 in the second storage area 420 as valid.

Accordingly, the printer driver 303 operates as a printer driver exclusively used for the model B.

The process illustrated in FIGS. 18 and 19 is an example of the process of installing the printer driver 303 according to the third embodiment.

(Installation Process 2—Third Embodiment)

Figure 20:
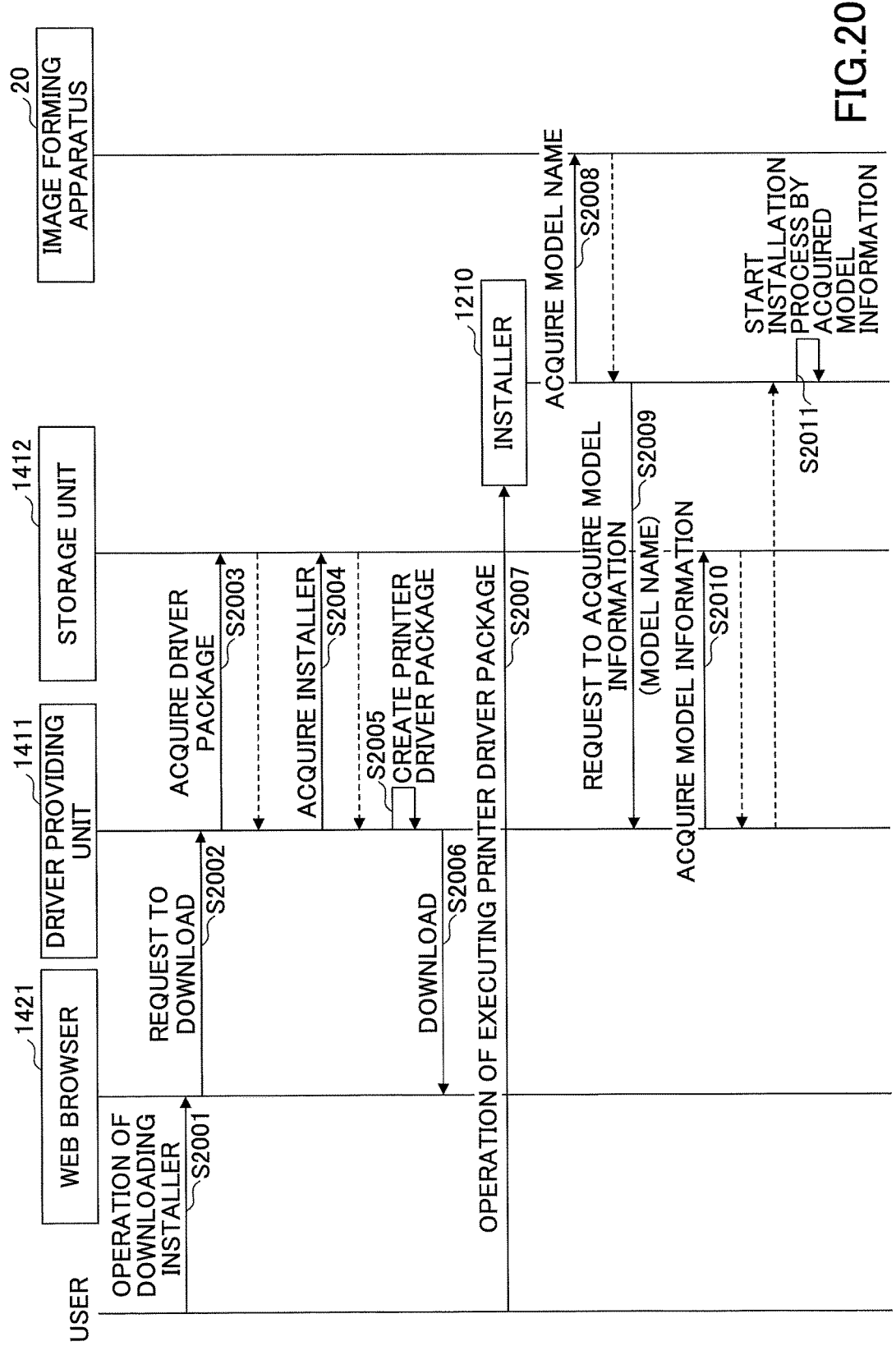
FIG. 20 is a sequence diagram (1) illustrating another example of the installation process according to the third embodiment of the present invention.

FIG. 20 is a sequence diagram (1) illustrating another example of the installation process according to the third embodiment. This process indicates an example of a process in the case where the model information is not included in the printer driver package (for example, the printer driver package 1423 of the model B) provided by the driver providing unit 1411 in FIG. 14, for example.

In step S2001, the user of the client device 10 performs an operation of downloading the installer by using the driver acquiring unit 1421 (for example, a web browser, etc.,) of the client device 10.

In step S2002, the driver acquiring unit 1421 of the client device 10 transmits a download request to the driver providing unit 1411 of the server apparatus 30 according to an operation by the user.

In steps S2003 and S2004, the driver providing unit 1411 of the server apparatus 30 acquires the installer 1210 and the printer driver package of minimum configuration 1413 from, for example, the storage unit 1412 of FIG. 14.

In step S2005, the driver providing unit 1411 of the server apparatus 30 creates a printer driver package including the installer 1210 and the printer driver package of minimum configuration 1413.

In step S2006, the driver acquiring unit 1421 of the client device 10 downloads the created printer driver package from the driver providing unit 1411 of the server apparatus 30.

In step S2007, the user of the client device 10 performs an operation of executing the downloaded printer driver package. For example, the user executes the installer 1210.

In step S2008, the installing unit 1211 of the installer 1210 acquires information such as the model name from the image forming apparatus 20 connected to the client device 10.

In step S2009, the installing unit 1211 of the installer 1210 requests the driver providing unit 1411 of the server apparatus 30 to acquire the model information corresponding to the acquired model name, etc.

In step S2010, the driver providing unit 1411 of the server apparatus 30 acquires the model information corresponding to the specified model name, etc., from the model information 1414*a* to 1414*c* of the plurality of models stored in the storage unit 1412 of FIG. 14. Furthermore, the driver providing unit 1411 transmits the acquired model information to the installer 1210 of the request source.

In step S2011, the installer 1210 executes the processes of step S1903 and onward in FIG. 19, by using the acquired model information.

(Installation Process 3—Third Embodiment)

Figure 21:
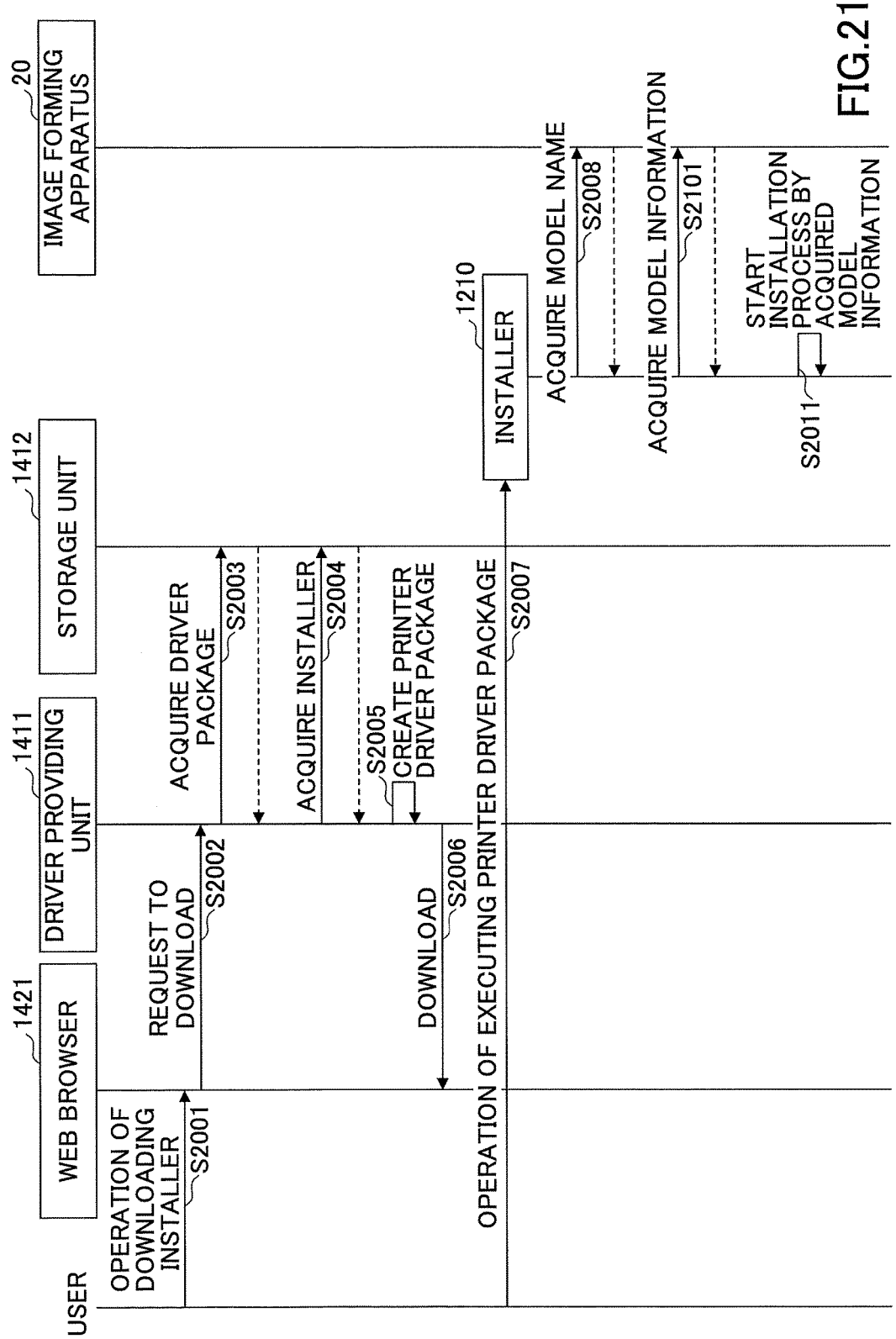
FIG. 21 is a sequence diagram (2) illustrating another example of the installation process according to the third embodiment of the present invention.

FIG. 21 is a sequence diagram (2) illustrating another example of the installation process according to the third embodiment. For example, this process indicates another example of a process performed when the model information is not included in the printer driver package (for example, the printer driver package 1423 of the model B) provided by the driver providing unit 1411 in FIG. 14.

In the installation process illustrated in FIG. 20, in steps S2009 and S2010, the installer 1210 acquires the model information corresponding to the image forming apparatus 20 from the driver providing unit 1411 of the server apparatus 30.

On the other hand, in the installation process illustrated in FIG. 21, in step S2101, the installer 1210 acquires the model information from the image forming apparatus 20. In this way, the installer 1210 may acquire the model information of the image forming apparatus 20 connected to the client device 10 from the image forming apparatus 20.

Note that in FIG. 21, processes other than step S2101 are the same as those of the installation process illustrated in FIG. 20.

As described above, according to the present embodiment, it is possible to implement a printer driver of a fixed model, by using the printer driver 303 that is a V4 printer driver common to models that can be used by a plurality of the image forming apparatuses 20.

Note that the printer driver 303 set as a printer driver of a fixed model, can function as a printer driver common to models, by cancelling the selection of the "fix model" check box 1701 in the setting screen 1700 of the printer driver 303 illustrated in FIG. 17.

As described above, according to the embodiments of the present invention, it is possible to easily add information relating to a new compatible model, to the printer driver 303 that is a V4 printer driver common to models that can be used by a plurality of the image forming apparatuses 20.

Furthermore, in the embodiments of the present invention, it is possible to add (or delete) information of a new compatible model to the printer driver 303 without modifying the printer driver 303 that is the V4 printer driver that has been authenticated. Therefore, even if a compatible model is added (or deleted), there is no need to authenticate the printer driver 303 again.

Furthermore, by utilizing the above mechanism, it is possible to use the printer driver 303, which is a V4 printer driver common to models, as a printer driver of a fixed model.

[Fourth Embodiment]

In the first to third embodiments, an example of the case where the second model information 645 is stored in the second storage area (Queue Property Bag) 420 has been described; however, a process of storing the second model information 645 in the second storage area 420 is a preferable example but not essential. In a fourth embodiment, an example of a process performed when the extension configurator 313 does not store the second model information 645 in the second storage area 420 will be described.

<Functional Configuration—Fourth Embodiment>

Figure 22:
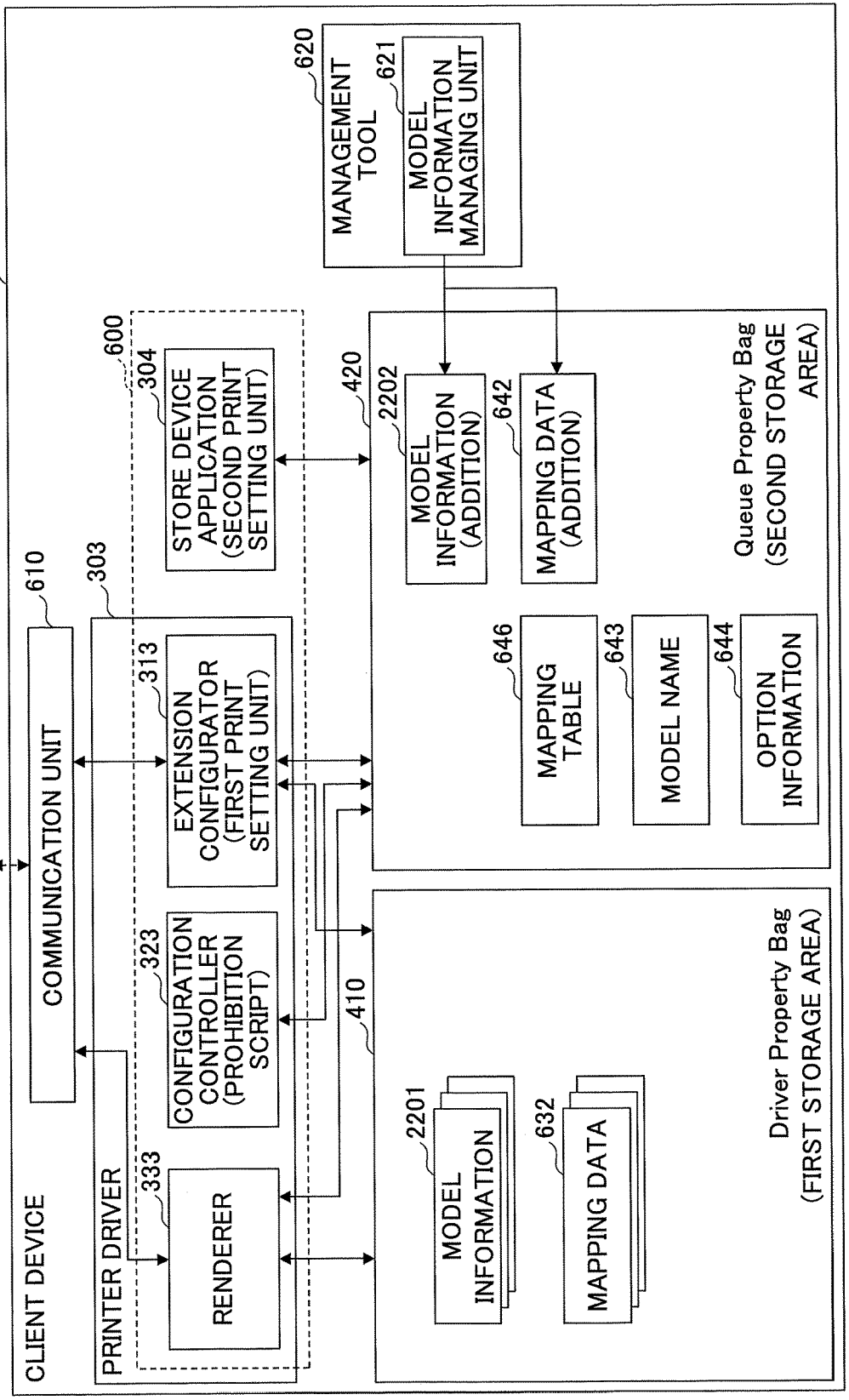
FIG. 22 is a functional block diagram of the client device according to the fourth embodiment of the present invention.

FIG. 22 is a functional block diagram of the client device according to the fourth embodiment. As illustrated in FIG. 22, the second model information 645, which is stored in the second storage area 420 in the first embodiment illustrated in FIG. 6, is not stored in the second storage area 420 according to the present embodiment.

In the present embodiment, the first model information 631, which is stored in the first storage area (Driver Property Bag) 410 in the first embodiment, is referred to as "model information 2201". Furthermore, the first model information (addition) 641, which is stored in the second storage area in the first embodiment, is referred to as "model information (addition) 2202" in the present embodiment.

In the present embodiment, the extension configurator 313 does not perform the process of generating the second model information 645 and storing the second model information 645 in the second storage area 420. Furthermore, the configuration controller 323 and the store device application 304 acquire the model name 643 stored in the second storage area 420, and acquire the model information of the model identified by the model name 643 from model information 2201 or the model information (addition) 2202. Accordingly, the configuration controller 323 and the store device application 304 can execute the same processes as in the first to third embodiments.

Note that the functional configuration of the client device 10 other than the above is similar to the configuration of the client device 10 according to the first embodiment illustrated in FIG. 6, and therefore detailed descriptions thereof will be omitted here.

Furthermore, in FIG. 22, the model information managing unit 621 included in the management tool 620 may be included in the installer 1210, similar to the client device 10 according to the second embodiment illustrated in FIG. 12.

<Process Flow—Fourth Embodiment>

Next, a process flow of the information processing method according to the fourth embodiment will be described.

(Process of Extension Configurator—Fourth Embodiment)

Figure 23:
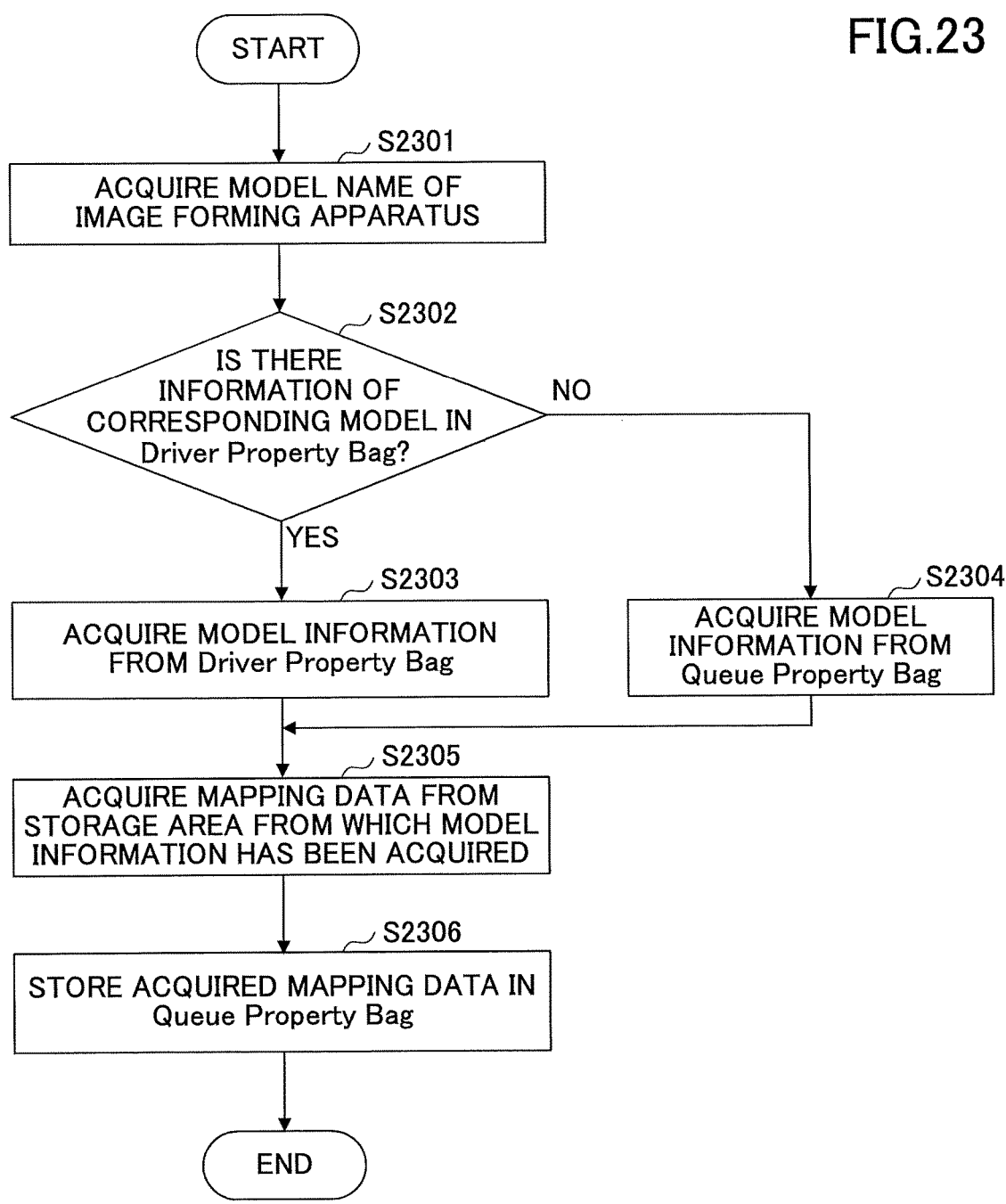
FIG. 23 is a flowchart illustrating an example of a process of the extension configurator according to the fourth embodiment of the present invention.

FIG. 23 is a flowchart illustrating an example of the process of the extension configurator 313 according to the fourth embodiment. The extension configurator 313 executes the process illustrated in FIG. 23, for example, when the extension configurator 313 is invoked by the installer, and when an image setting screen for making print settings for printing a file is invoked, etc. Furthermore, the process illustrated FIG. 23 is executed, for example, when the extension configurator 313 is invoked to display a property screen for making device settings of the second storage area 420, etc. Note that the process illustrated in FIG. 23 does not necessarily have to be executed when the extension configurator 313 is invoked; the process illustrated in FIG. 23 may be executed when a user specifies a model via the UI or when a change in the model is detected by bidirectional communication.

In step S2301, the device information acquiring unit 703 of the extension configurator 313 acquires information such as the model name (or model ID) of the image forming apparatus 20 connected to the client device 10. Note that this process is the same as the process of step S1001 in FIG. 10, and therefore detailed descriptions will be omitted here. Furthermore, the device information acquiring unit 703 stores information of the acquired model name, etc., at the model name 643 in the second storage area 420.

Preferably, at this time, the device information acquiring unit 703 acquires option information of the image forming apparatus 20 connected to the client device 10, and stores the acquired option information, for example, at the option information 644 in the second storage area 420.

In step S2302, the model information acquiring unit 704 of the extension configurator 313 determines whether there is model information of the image forming apparatus 20 corresponding to the model name, etc., acquired by the device information acquiring unit 703, in the first storage area 410.

When there is model information of the corresponding image forming apparatus 20 in the first storage area 410, the model information acquiring unit 704 causes the process to proceed to step S2303. Conversely, when there is no model information of the corresponding image forming apparatus 20 in the first storage area 410, the model information acquiring unit 704 causes the process to proceed to step S2304.

When the process proceeds to step S2303, the model information acquiring unit 704 acquires the model information of the image forming apparatus 20 (the image forming apparatus 20 connected to the client device 10) corresponding to the acquired model name, etc., from the model information 2201 in the first storage area 410.

Conversely, when the process proceeds to step S2304, the model information acquiring unit 704 acquires the model information of the image forming apparatus 20 corresponding to the acquired model name, etc., from the model information (addition) 2202 in the second storage area 420.

Note that as indicated in steps S2302 to S2304 in FIG. 23, the process in which the model information acquiring unit 704 acquires the model information preferentially from the first storage area 410, is one example.

For example, in step S2302, the model information acquiring unit 704 may determine whether there is model information of the image forming apparatus 20 corresponding to the acquired model name, etc., in the second storage area 420, and may acquire model information preferentially from the second storage area 420. Accordingly, for example, even when the image forming apparatus 20 is already registered in the model information 2201 stored in the first storage area 410, it is possible to update the model information by storing the model information (addition) 2202 in the second storage area 420.

In step S2305, the model information acquiring unit 704 of the extension configurator 313 acquires mapping data of the image forming apparatus 20 corresponding to the acquired model name, etc., from the storage area from which the model information has been acquired in steps S2302 to S2304.

In step S2306, the storage control unit 706 of the extension configurator 313 applies (stores) the acquired mapping data to (in) the mapping table 646 of the second storage area 420.

By the above process, even when the model information of the connected image forming apparatus 20 is not included in the model information 2201, the client device 10 can use the model information (addition) 2202 stored in the second storage area, to execute the process.

Note that the processes indicated in steps S2305 and S2306 in FIG. 23 are a preferable example, are not essential. For example, when the processes indicated in steps S2305 and S2306 are not performed, in order to use the mapping data, the configuration controller 323 and the store device application 304, etc., may refer to the model name 643, and may acquire the mapping data corresponding to the model name 643 each time.

(Print Setting Information Output Process—Fourth Embodiment)

Figure 24A:
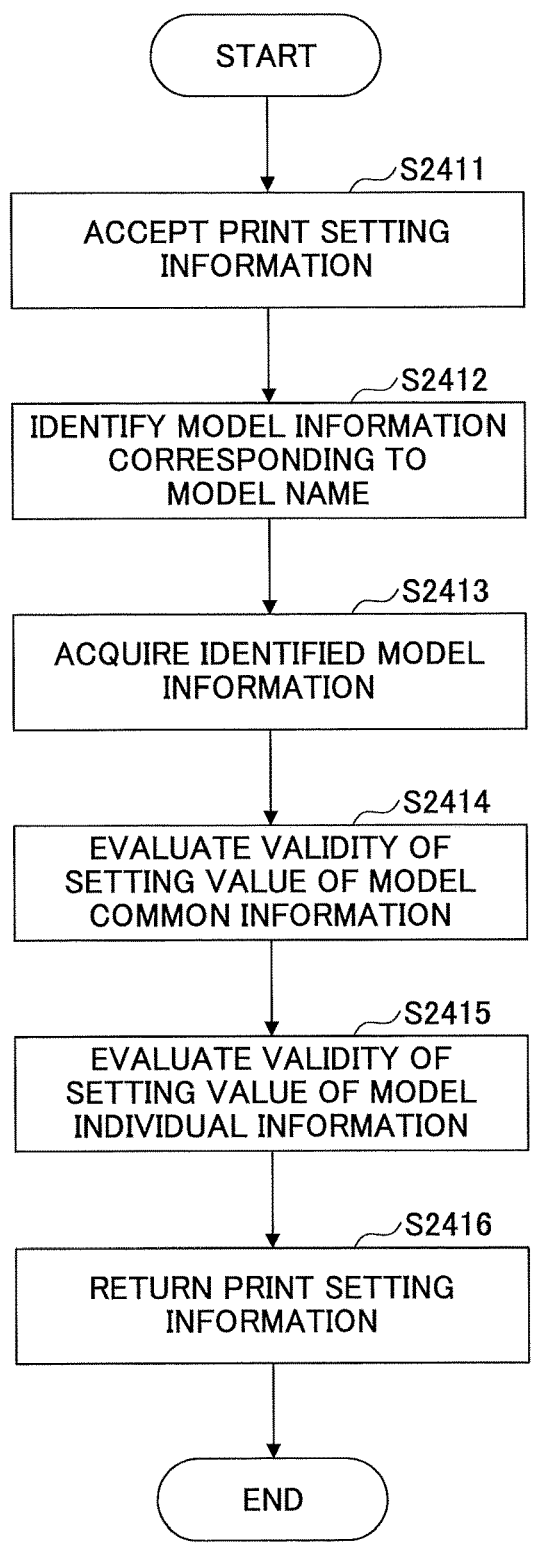
FIG. 24A is a flowchart illustrating an example of a process of outputting the print setting information according to the fourth embodiment of the present invention.

FIG. 24A is a flowchart illustrating an example of a process of outputting the print setting information according to the fourth embodiment. This process corresponds to, for example, the process of outputting the print setting information according to the first embodiment illustrated in FIG. 11A.

In step S2411, the configuration controller 323 of the printer driver 303 accepts print setting information from the desktop application 321, etc.

In step S2412, the configuration controller 323 acquires the model name 643 stored in the second storage area 420, and identifies the model information corresponding to the acquired model name 643, from among the model information 2201 and the model information (addition) 2202.

In step S2413, the configuration controller 323 acquires the identified model information.

In step S2414, the configuration controller 323 evaluates the validity of the setting value in the model common information, based on the acquired model information. The validity of the model common information is evaluated by confirming whether the setting value of the print setting information that does not depend on each model and that is common to the respective image forming apparatuses 20, is a valid value. An example of model common information is, for example, aggregate setting.

Preferably, when the confirmation result is invalid, the configuration controller 323 executes a prohibition process for resolving the inconsistency in the print setting information (for example, a process of changing or deleting an invalid setting item or an invalid setting value, etc.), to resolve the inconsistency in a setting item or a setting value, etc., in the print setting information common to models.

In step S2415, the configuration controller 323 evaluates the validity of the setting value in the model individual information based on the acquired model information. The validity of model individual information is evaluated by confirming that the option information and the finishing function, etc., do not exceed the capabilities of the selected image forming apparatus 20, for each print scheme (setting item).

Preferably, when the confirmation result is invalid, the configuration controller 323 executes a prohibition process for resolving the inconsistency in the print setting information (for example, a process of changing or deleting an invalid setting item or an invalid setting value, etc.), to resolve the inconsistency in a setting item or a setting value, etc., in the print setting information that depends on models.

In step S2416, the configuration controller 323 returns the print setting information for which the validity has been evaluated, to the desktop application 321, and ends the process.

(Process of Outputting Printing Capability Information—Fourth Embodiment)

Figure 24B:
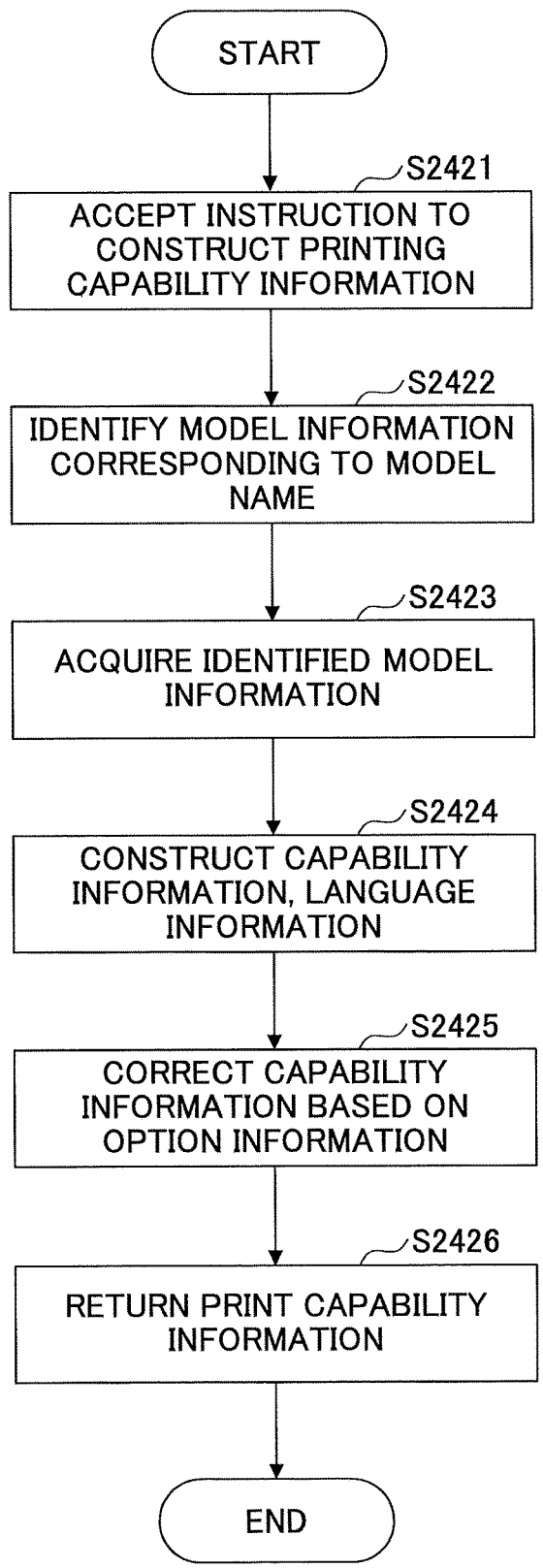
FIG. 24B is a flowchart illustrating an example of a process for outputting printing capability information according to the fourth embodiment of the present invention.

FIG. 24B is a flowchart illustrating an example of a process for outputting printing capability information. This process corresponds to, for example, the process of outputting the printing capability information according to the first embodiment illustrated in FIG. 11B.

In step S2421, the configuration controller 323 accepts an instruction to construct the printing capability information, from the desktop application 321, etc.

In step S2422, the configuration controller 323 acquires the model name 643 stored in the second storage area 420, and identifies the model information corresponding to the acquired model name 643, from among the model information 2201 and the model information (addition) 2202.

In step S2423, the configuration controller 323 acquires the identified model information.

In step S2424, the configuration controller 323 constructs printing capability information and language information. In the construction of the printing capability information, options of setting values are constructed for each print scheme.

Furthermore, the language information is constructed for each setting value, based on the OS 302 and the locale (setting of the country or region) of the desktop application 321. The language information of the setting value is, for example, information such as "staple, upper right", etc.

In step S2425, the configuration controller 323 corrects the printing capability information constructed in step S2424, based on the option information 644 stored in the second storage area 420. The correction of the capability information is addition or deletion of options of setting values, etc.

In step S2426, the configuration controller 323 returns the corrected printing capability information to the desktop application 321, and ends the process.

According to the processes illustrated in FIGS. 24A and 24B, based on the model name 643 stored in the second storage area 420, the configuration controller 323 can construct model common information, model individual information, and printing capability information, etc., according to the image forming apparatus 20 connected to the client device 10.

(Display Process by Store Device Application—Fourth Embodiment)

Figure 24C:
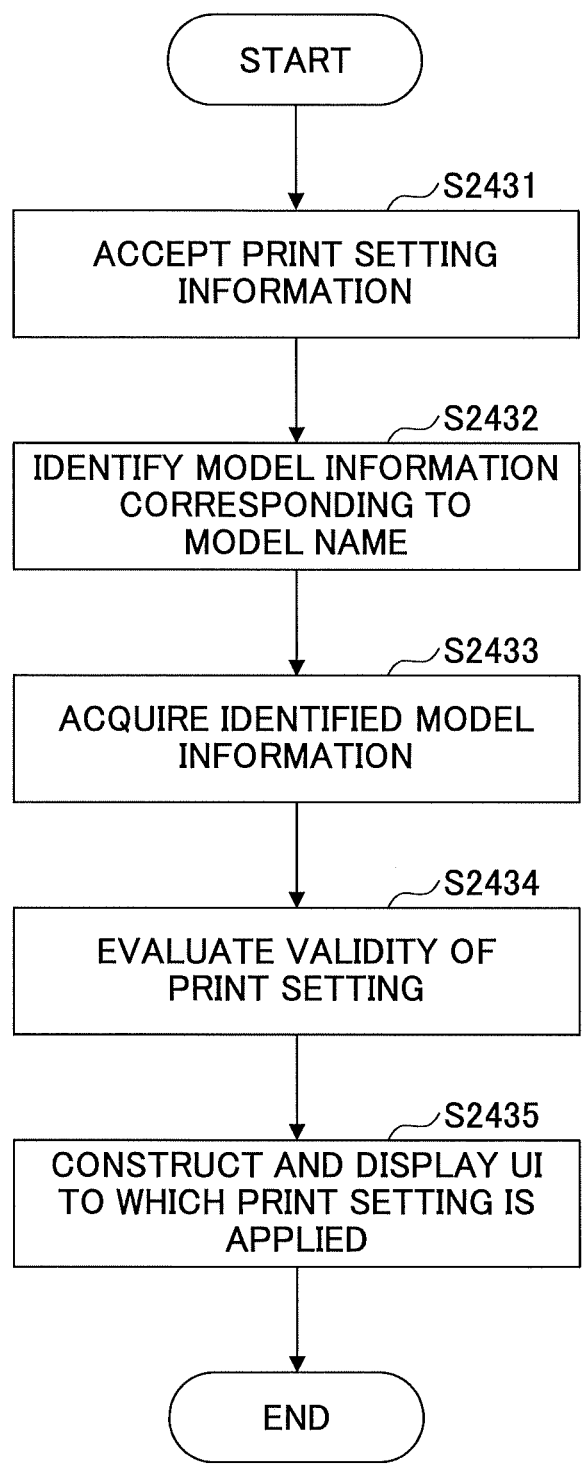
FIG. 24C is a flowchart illustrating an example of a display process by the store device application according to the fourth embodiment of the present invention.

FIG. 24C is a flowchart illustrating an example of a display process by the store device application. This process corresponds to, for example, the display process by the store device application according to the first embodiment illustrated in FIG. 11C.

In step S2431, the store device application 304 accepts print setting information from the configuration controller 323.

In step S2432, the store device application 304 acquires the model name 643 stored in the second storage area 420, and identifies the model name corresponding to the acquired model name 643, from among the model information 2201 and the model information (addition) 2202.

In step S2433, the store device application 304 acquires the identified model information.

In step S2434, the store device application 304 creates printing capability information corresponding to the image forming apparatus 20 connected to the client device 10 by using the configuration controller 323, and evaluates the validity of the print setting information.

In step S2435, the store device application 304 constructs and displays a print setting screen, in which the print setting information is applied to printing capability information of the image forming apparatus 20 connected to the client device 10, and ends the process.

By the above process, the store device application 304 can display a print setting screen (second print setting screen) corresponding to the image forming apparatus 20 connected to the client device 10.

As described above, according to the present embodiment, even when the second model information 645 is not stored in the second storage area, the configuration controller 323 and the store device application 304 can acquire the model information of the image forming apparatus 20 based on the model name 643, and can execute a predetermined process.

As described above, according to the embodiments of the present invention, it is possible to easily add information of a new compatible model, to a V4 printer driver common to models, the V4 printer driver being usable by a plurality of image forming apparatuses.

The information processing apparatus, the information processing system, and the information processing method are not limited to the specific embodiments described in the detailed description, and variations and modifications may be made without departing from the spirit and scope of the present invention.

What is claimed is:

1. An information processing apparatus for executing a printer driver that is available to one or more image forming apparatuses that are connected to the information processing apparatus via network, the information processing apparatus comprising a processor, in communication with a memory, executing a process including:
   displaying, by a first print setter on a display device, a first print setting screen for making a setting relating to printing by the printer driver;
   displaying, by a second print setter on the display device, a second print setting screen for making a setting relating to the printing, the second print setting screen being different from the first print setting screen;
   storing, in a first storage area, one or more pieces of first model information including information relating to a model corresponding to a predetermined image forming apparatus that is preliminarily registered in the printer driver among the one or more image forming apparatuses, wherein information cannot be added to the first storage area after the printer driver is installed in the information processing apparatus;
   storing, by a model information manager in a second storage area that is different from the first storage area, the first model information corresponding to another image forming apparatus, among the one or more image forming apparatuses, that is different from the predetermined image forming apparatus, wherein information can be added to the second storage area after the printer driver is installed in the information processing apparatus;
   storing, by the first print setter in the second storage area, connection destination information including information for identifying an image forming apparatus, among the one or more image forming apparatuses, connected to the information processing apparatus; and
   displaying, by the second print setter, the second print setting screen corresponding to the image forming apparatus connected to the information processing apparatus, by using the connection destination information stored in the second storage area.

2. The information processing apparatus according to claim 1, wherein
   the connection destination information includes information relating to a model corresponding to the image forming apparatus connected to the information processing apparatus, the connection destination information being second model information usable by the second print setter,
   wherein the process further includes:
      acquiring, by the first print setter from the first model information stored in the first storage area or the first model information stored in the second storage area, the first model information corresponding to the image forming apparatus connected to the information processing apparatus;
      generating, by the first print setter, the second model information by using the acquired first model information;
      storing, by the first print setter, the generated second model information in the second storage area; and
      displaying, by the second print setter, the second print setting screen corresponding to the image forming apparatus connected to the information processing apparatus, by using the second model information stored in the second storage area.

3. The information processing apparatus according to claim 2, wherein the process further includes generating, by the first print setter from the acquired first model information, the second model information in a format that is processable according to a script language.

4. The information processing apparatus according to claim 2, wherein the process further includes generating, by the first print setter, the second model information by deleting, from the acquired first model information, information unnecessary for controlling the image forming apparatus connected to the information processing apparatus.

5. The information processing apparatus according to claim 2, wherein the process further includes causing, by the printer driver, the information processing apparatus to function as:
   a setting controller configured to control setting information for executing printing by the image forming apparatus connected to the information processing apparatus, by using the second model information stored in the second storage area; and
   a renderer configured to generate print data that is printable by the image forming apparatus connected to the information processing apparatus, by using the setting information.

6. The information processing apparatus according to claim 2, wherein the second model information has less information than the first model information by deleting information, from the first model information, that is not necessary for a control of the information processing apparatus.

7. The information processing apparatus according to claim 1, wherein the process further includes:
   displaying, by the model information manager, information of a plurality of the other image forming apparatuses usable by the printer driver, in a selectable manner on the display device; and
   storing, by the model information manager in the second storage area, the first model information corresponding to a selected image farming apparatus among the plurality of the other image forming apparatuses.

8. The information processing apparatus according to claim 1, wherein the process further includes:
   storing, in the second storage area, model fix information that is settable as valid or invalid by a user; and
   changing, by the model information manager, a logical printer name of the printer driver to a name corresponding to the first model information stored in the second storage area, in response to determining that the model fix information is set as valid.

9. The information processing apparatus according to claim 1, wherein the process further includes:
   executing an install program configured to install the printer driver; and
   causing the information processing apparatus to function as the model information manager, by the install program.

10. The information processing apparatus according to claim 1, wherein the process further includes:
    executing a management program configured to manage the printer driver; and causing the information processing apparatus to function as the model information manager, by the management program.

11. The information processing apparatus according to claim 1, wherein the process further includes causing the information processing apparatus to function as the first print setter, by the printer driver.

12. The information processing apparatus according to claim 1, wherein the process further includes:
executing a store device application corresponding to the printer driver; and
causing the information processing apparatus to function as the second print setter, by the store device application.

13. The information processing apparatus according to claim 1, wherein
the first storage area includes a Driver Property Bag configured to store information relating to the printer driver, and
the second storage area includes a Queue Property Bag configured to store information relating to the printer driver.

14. An information processing system comprising:
an information processing apparatus configured to execute a printer driver that is available to one or more image forming apparatuses that are connected to the information processing apparatus via network; and
an image forming apparatus, among the one or more image forming apparatuses, connected to the information processing apparatus,
wherein the information processing apparatus includes a processor, in communication with a memory, executing a process including:
displaying, by a first print setter on a display device, a first print setting screen for making a setting relating to printing by the printer driver;
displaying, by a second print setter on the display device, a second print setting screen for making a setting relating to the printing, the second print setting screen being different from the first print setting screen;
storing, in a first storage area, one or more pieces of first model information including information relating to a model corresponding to a predetermined image forming apparatus that is preliminarily registered in the printer driver among the one or more image forming apparatuses, wherein information cannot be added to the first storage area after the printer driver is installed in the information processing apparatus;
storing, by a model information manager in a second storage area that is different from the first storage area, the first model information corresponding to another image forming apparatus, among the one or more image forming apparatuses, that is different from the predetermined image forming apparatus, wherein information can be added to the second storage area after the printer driver is installed in the information processing apparatus;
storing, by the first print setter in the second storage area, connection destination information including information for identifying the image forming apparatus connected to the information processing apparatus; and
displaying, by the second print setter, the second print setting screen corresponding to the image forming apparatus connected to the information processing apparatus, by using the connection destination information stored in the second storage area.

15. An information processing method executed by a computer in an information processing apparatus for executing a printer driver that is available to one or more image forming apparatuses that are connected to the information processing apparatus via network, the information processing method comprising:
displaying, by a first print setter on a display device, a first print setting screen for making a setting relating to printing by the printer driver;
displaying, by a second print setter on the display device, a second print setting screen for making a setting relating to the printing, the second print setting screen being different from the first print setting screen;
storing, in a first storage area, one or more pieces of first model information including information relating to a model corresponding to a predetermined image forming apparatus that is preliminarily registered in the printer driver among the one or more image forming apparatuses, wherein information cannot be added to the first storage area after the printer driver is installed in the information processing apparatus;
storing, by a model information manager in a second storage area that is different from the first storage area, the first model information corresponding to another image forming apparatus, among the one or more image forming apparatuses, that is different from the predetermined image forming apparatus, wherein information can be added to the second storage area after the printer driver is installed in the information processing apparatus;
storing, by the first print setter in the second storage area, connection destination information including information for identifying an image forming apparatus, among the one or more image forming apparatuses, connected to the information processing apparatus; and
displaying, by the second print setter, the second print setting screen corresponding to the image forming apparatus connected to the information processing apparatus, by using the connection destination information stored in the second storage area.

* * * * *

UNITED STATES PATENT AND TRADEMARK OFFICE
CERTIFICATE OF CORRECTION

PATENT NO. : 10,191,697 B2
APPLICATION NO. : 15/922146
DATED : January 29, 2019
INVENTOR(S) : Hiroto Kobayashi Page 1 of 1

It is certified that error appears in the above-identified patent and that said Letters Patent is hereby corrected as shown below:

On the Title Page

Item (73) delete:
"Ricoh Company Ltd."

Insert:
--Ricoh Company, Ltd.--

Signed and Sealed this
Twenty-third Day of April, 2019

Andrei Iancu
*Director of the United States Patent and Trademark Office*